United States Patent
Rodriguez Rios et al.

(10) Patent No.: US 12,088,109 B2
(45) Date of Patent: Sep. 10, 2024

(54) SYSTEM FOR THE EXTRACTION OF ENERGY FROM THE ELECTRIC FIELD OF POWER CABLES

(71) Applicants: Borja Rodriguez Rios, Santiago (CL); Mariano Lopez Gomez, Santiago (CL)

(72) Inventors: Borja Rodriguez Rios, Santiago (CL); Mariano Lopez Gomez, Santiago (CL)

( * ) Notice: Subject to any disclaimer, the term of this patent is extended or adjusted under 35 U.S.C. 154(b) by 268 days.

(21) Appl. No.: 17/452,467

(22) Filed: Oct. 27, 2021

(65) Prior Publication Data

US 2022/0115905 A1    Apr. 14, 2022

Related U.S. Application Data

(63) Continuation of application No. PCT/CL2019/050081, filed on Sep. 3, 2019.

(51) Int. Cl.
| | | |
|---|---|---|
| *H02J 50/00* | (2016.01) | |
| *H01B 9/00* | (2006.01) | |
| *H02G 1/06* | (2006.01) | |
| *H02J 50/10* | (2016.01) | |

(52) U.S. Cl.
CPC ............ *H02J 50/001* (2020.01); *H02G 1/06* (2013.01); *H01B 9/00* (2013.01); *H02J 50/005* (2020.01); *H02J 50/10* (2016.02)

(58) Field of Classification Search
CPC ........ H02J 50/001; H02J 50/005; H02J 50/10; H02G 1/06; H01B 9/00
USPC ................................................ 307/104, 147
See application file for complete search history.

(56) References Cited

U.S. PATENT DOCUMENTS

| | | | |
|---|---|---|---|
| 9,663,045 | B2 | 5/2017 | Satoh |
| 10,014,091 | B2 * | 7/2018 | Lopez Gomez .......... F21S 4/26 |
| 2010/0084920 | A1 | 4/2010 | Banting et al. |
| 2010/0282491 | A1 | 11/2010 | Cofre Luna et al. |
| 2016/0322914 | A1 | 11/2016 | Rodriguez Rios |

FOREIGN PATENT DOCUMENTS

| | | |
|---|---|---|
| CA | 2881362 | 3/2014 |
| CL | 200901705 | 4/2010 |
| CN | 204303384 | 4/2015 |
| DE | 102014010414 | 1/2016 |
| EP | 2072571 | 6/2009 |

(Continued)

OTHER PUBLICATIONS

International Search Report and Written Opinion in International Appln. No. PCT/CL2019/050081, dated May 5, 2020, 6 pages [Machine Translated].

(Continued)

*Primary Examiner* — Hal Kaplan

(74) *Attorney, Agent, or Firm* — Fish & Richardson P.C.

(57) ABSTRACT

Systems for extracting electrical energy in power cables, from the electric field, without making electrical contact with the main conductors of the cable, which comprises a power cable and an extraction device of energy from the electric field, which captures the electric field inside the power cable, with alternating or direct voltage. Devices for extracting energy from the electric field. Manufacturing (Continued)

methods of the energy extraction system in power cables from the electric field. Manufacturing methods of the energy extraction device.

22 Claims, 25 Drawing Sheets

(56) References Cited

FOREIGN PATENT DOCUMENTS

| | | |
|---|---|---|
| FR | 1334652 | 8/1963 |
| JP | 2016062816 | 4/2016 |
| WO | WO 2010131084 | 11/2010 |
| WO | WO 2014026300 | 2/2014 |
| WO | WO 2014128522 | 8/2014 |
| WO | WO 2017021100 | 2/2017 |
| WO | WO 2017032933 | 3/2017 |
| WO | WO 2020178534 | 9/2020 |
| WO | WO 2020178535 | 9/2020 |
| WO | WO 2021042218 | 3/2021 |

OTHER PUBLICATIONS taiwantrade.com [Online], "Power Cable Making Plant," available on or before Oct. 22, 2012 via Internet Archive: Wayback Machine URL <https://web.archive.org/web/20121022162655/http://turnkey.taiwantrade.com.tw/en/Content.aspx?ID=65> retrieved on Mar. 1, 2022, URL<http://turnkey.taiwantrade.com.tw/en/Content.aspx?ID=65>, 5 pages.

International Preliminary Report on Patentability in International Application No. PCT/CL2019/050081, mailed on Mar. 8, 2022, 14 pages (with English Translation).

Notice of Acceptance in Australian Application No. 2019465141, dated Feb. 8, 2023, 3 pages.

Office Action in Australian Application No. 2019465141, dated Dec. 13, 2022, 3 pages.

Office Action in Australian Application No. 2019465141, dated Sep. 27, 2022, 4 pages.

Office Action in Chinese Application No. 201980097007, dated May 27, 2023, 10 pages (with English Translation).

* cited by examiner

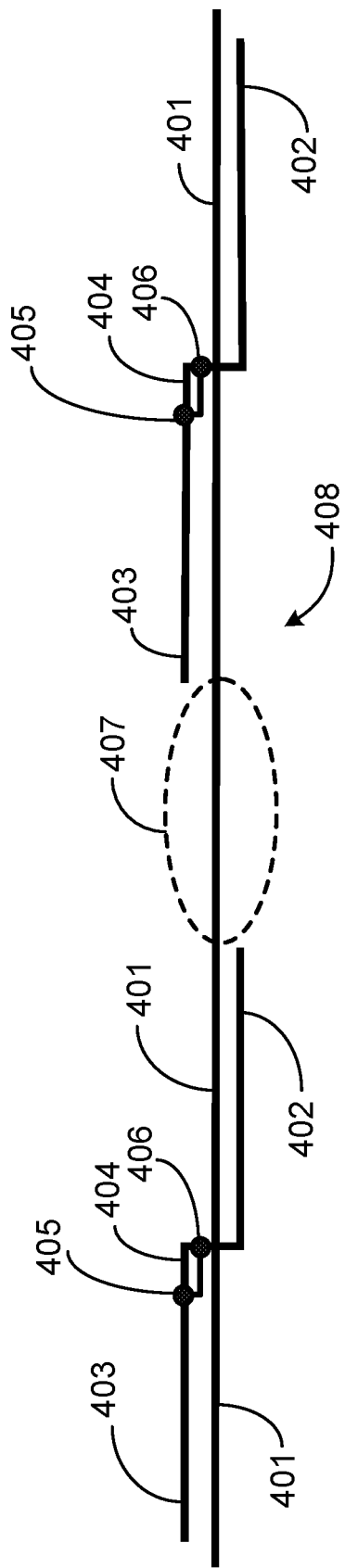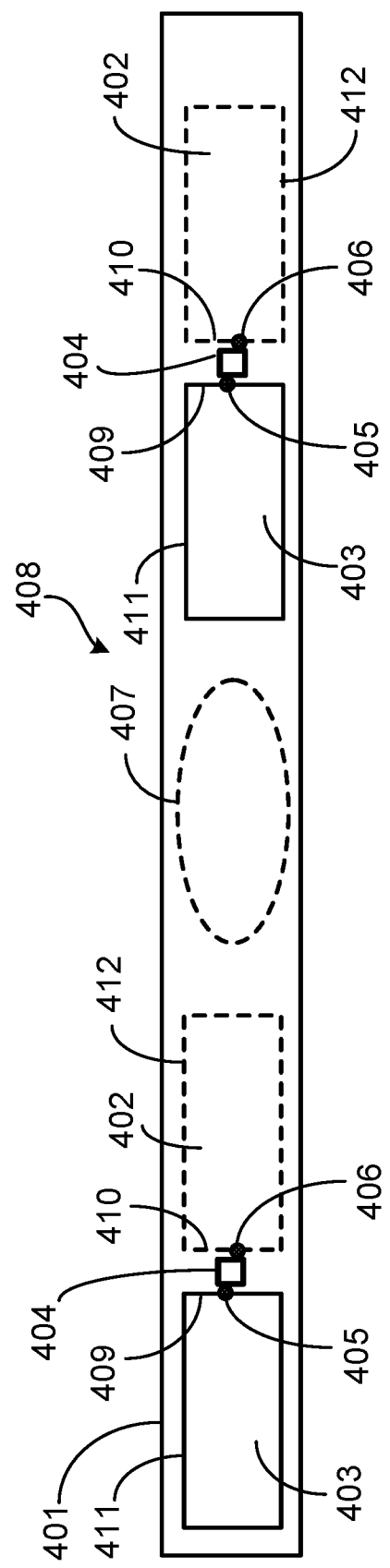
FIG. 4A
FIG. 4B

SYSTEM FOR THE EXTRACTION OF ENERGY FROM THE ELECTRIC FIELD OF POWER CABLES

CROSS-REFERENCE TO RELATED APPLICATIONS

This application is a continuation of, and claims priority to International Application No. PCT/CL2019/050081, filed Sep. 3, 2019, the contents of which are incorporated herein by reference in their entirety.

TECHNICAL FIELD

This present disclosure relates to extraction of energy from the electric field of power cables.

BACKGROUND

Nowadays there are technical solutions to aid in visualizing cables in order to minimize their damage caused by the traffic of large-sized mining equipment.

Five solutions known so far are:
a) The first solution is a cable with an external fluorescent-pigmented layer. However, since it is a trailing cable, the pigment is short-lived owing to its direct exposure to abrasive soil, air, water and UV radiation. Besides, the fluorescence lasts for short periods of time in the dark, because this type of pigment emits luminescence by the decay of electrons which have been previously excited by sunlight (generally pigments with resonant chemical structures) and this type of electrochemical processes are of short lifespan as presented in patent EP2072571 B1.
b) The second solution is the use of helical-wound reflective tapes over the cable external layer. This technology may be found on "cables with reflective Tiger Stripes", a Nexans-Amer Cable product (WO 2017/032933 A1). However, as it is a trailing cable, this tape is too much exposed to soil abrasion and is easily destroyed. The reflective tapes work through the refraction and reflection phenomena of the external incident light on the cable. This phenomenon is based on the over excitation and fast electrons decoupling in resonant chemical structures which cause the tape to shine in response to the illumination and then to stop shining if incident light is not maintained.
c) The third solution is a mixture of the two previously mentioned solutions. This means that it is a cable comprising a fluorescent or photo luminescent layer plus a reflective layer, both protected under a transparent thermoplastic jacket. This solution offers a higher resistance to abrasion, but (i) the reflective layer only highlights the cable while a light beam insides in a certain angle on the cable is present. If the incident angle is out of range, the cable does not reflect the light, thus remaining dark as well as its surrounding environment; and (ii) the luminous effect of the photo luminescent layer has a low intensity and only one hour lifespan despite of having been exposed for hours to daylight. These technologies are described under CL1705-2009, PCT/IB2009/056024 and US 2010/0282491 A1, registered by Nexans.

Another example of this type of cable is that of the company Condumex, Seguriflex model, with reflective tape and outer covering of TPU (polyurethane). In this cable the reflective tapes are protected by a polyurethane cover, but the abrasion of the ground damages the external jacket of the cable, preventing reflection of light from the tapes and then the proper functioning over time. This is seen in patent application WO2014128522.

d) A fourth solution is the one proposed by the inventors of the present application, and corresponds to a power cable that lights up, taking advantage of the magnetic field when current flows through the cable itself. This current circulation occurs when the equipment that is powered by the cable is consuming energy. This fourth solution corresponds to patent application PCT/CL2012/000044. It is an improvement in terms of duration and intensity of the light emitted by the cable, however, it requires alternating current circulating through the conductors (101) and the corresponding alternating magnetic field generated (103). This magnetic field is necessary to achieve induction in the energy harvesters or extractors, which are coils. From this magnetic energy the cable is illuminated, therefore, it is not constantly illuminated, but only a partial time in operation. Additionally, both the current harvesting element and the light emitting element are relatively large (height), compared to the cable phase diameter (1101, 1401) (approximately 6 mm vs 26 mm). In this way, even when the power cable (606, 801, 1201) with technology inside complies with the required standards regarding the final external diameter (ICEA S-75-381-2008, part 3.22), the cable (606, 801, 1201) turns out to be approximately 10% bigger in diameter than a cable (606, 801, 1201) without technology. This results in higher manufacturing costs, less flexibility and greater weight of the power cable. These three factors are relevant, the last two being very important in field operations. Finally, to be economically viable and reliable (few connections), the lighting system must have very long elements, which makes it little redundant and ultimately unreliable.
e) A fifth solution corresponds to power cables (606, 801, 1201) that are connected to an external power source. These cables are those commercially offered by the companies Telefonika and Prysmian (Tenax-Lumen). These solutions employ low-power, high-visibility LED strip lights and electroluminescent strips, respectively. However, these solutions depend on an external power source and are therefore unreliable in that connection. Such reliability is hardly possible in the harsh working environment of mining cables. Additionally, it can only be powered one cable length and in order to connect extensions to it, they depend on the possibility of connecting the cable lighting system to industrial plugs, using cables of much smaller gauge and therefore very weak with respect to the cable phases (1101, 1401). Today, these connections required for extending cables do not exist neither in the installed park of industrial plugs, nor in the new industrial plugs.

It is clear then that the industry still requires solutions that consider the downsides of the previous solutions.

SUMMARY

In general, in some aspects, the subject matter of the present disclosure is embodied in systems for extracting electrical energy in power cables, from the electric field, without making electrical contact with the main conductors of the cable, which can include a power cable and an extraction device of energy from the electric field, which captures the electric field inside the power cable, with alternating or direct voltage. In general, in some aspects, the subject matter of the present disclosure is embodied in devices for extracting energy from the electric field. In general, in some aspects, the subject matter of the present disclosure is embodied in methods of manufacturing the systems for extracting energy from the electric field in power cables and the devices for extracting electric energy, from the electric field.

The details of one or more embodiments of the invention are set forth in the accompanying drawings and the description below. Other features and advantages of the invention will be apparent from the description, drawings, and claims.

BRIEF DESCRIPTION OF THE DRAWINGS

FIG. 4A is a side view of an example of a device for extracting energy from the electric field (408) and a diagram of an electronic circuit representing the load (404) electrically powered by the device for extracting energy from the electric field (408).

FIG. 4B is a top view of an example of a device for extracting energy from the electric field (408) and a diagram of an electronic circuit representing the load (404) electrically powered by the device for extracting energy from the electric field (408).

DETAILED DESCRIPTION

Figure 1:
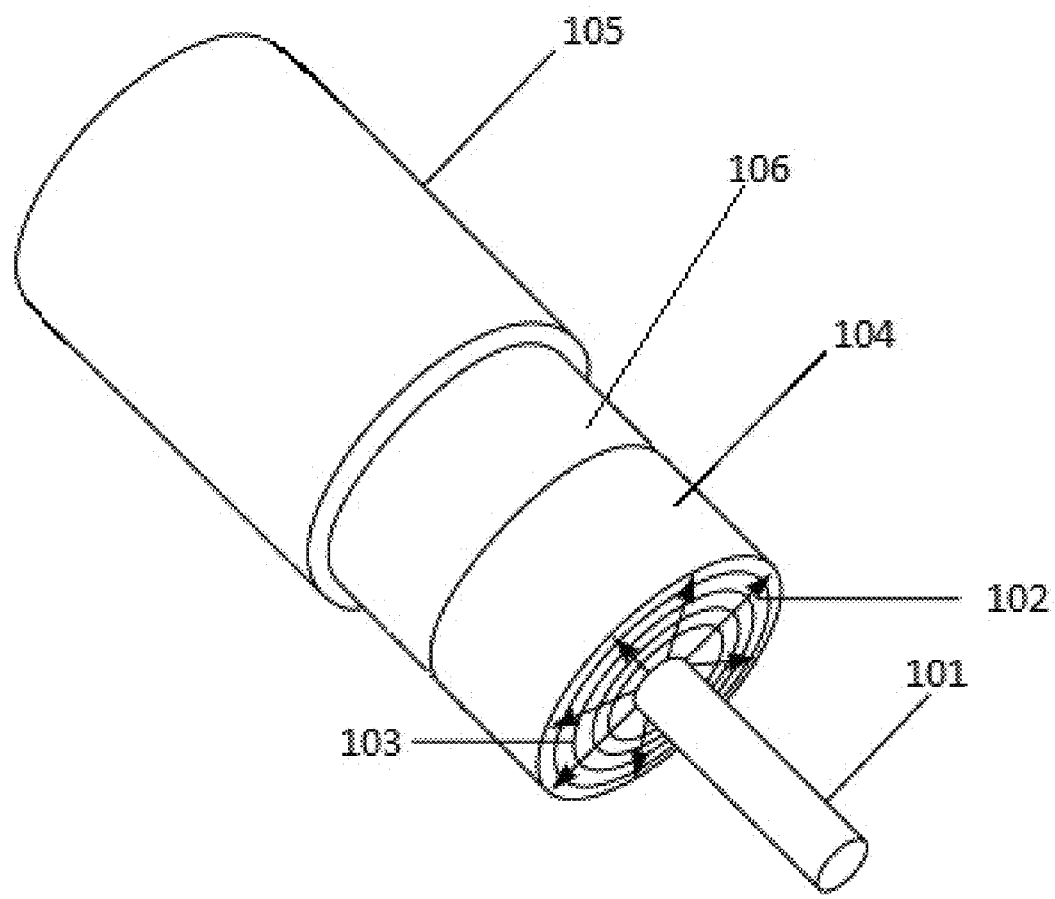
FIG. 1 shows an example of the electric field control layers of one of the phases of a medium voltage electric cable (606, 801).

At the present time, certain industries have benefited from a strong and steady rise in the price of products sold as a result of their activity. Such is the case of the mining industry which for some time has experienced a price increase of the extracted minerals. As a consequence of this phenomenon the operation has been lately focused on increasing production to take advantage of the high prices for these products. Such is the case of several minerals such as iron, copper, aluminum, silver, gold, etc.

In order to increase production and take advantage of the mineral's high prices, a good management of certain critical equipment is of the utmost importance. This is a real fact in every industry with intensive use of machinery and in the case of mining, an important part of operational efficiency can be achieved in the first process called "Mine Operations". This set of operations includes among other steps: (i) "drilling" in which certain specialized machinery drills the rock; (ii) "explosion" in which each borehole is loaded with explosive charge. Once detonated, the rock is reduced to sizes suitable for being processed in further steps; (iii) and the last step is "haulage" in which the rock is mounted on large-sized trucks through the loading shovel.

In a mining operation there is usually one haulage shovel for every 5 to 10 large-sized trucks, therefore the failure of one of these loading shovels may easily become a bottleneck for the whole mining operation.

Hence one of the critical equipment in mining operations is the loading shovel. In addition to this equipment there are other critical ones such as drilling machines and borers.

Identical operations are performed in underground mining but the equipment models are different especially in height and because of the space available which is narrower.

Therefore, any improvement allowing a more efficient operation of this type of equipment, may turn into operational efficiencies in the mine operation as a whole.

This type of equipment such as shovels and some drilling machines are powered with three-phase half-tension electricity (8 kV or 15 kV). Therefore the power supply that enables these equipment to operate properly is also critical. Power is supplied through multipolar, insulated, flexible, medium voltage, trailing cables arranged at the same site where the large-sized equipment (drilling machines, shovels, and trucks) freely and constantly move.

The traffic of these large-sized equipment over the same field where the medium voltage cables are, is risky for the power supply and the safety of workers operating the equipment if eventually they damage the cables by destruction or severe abrasion when circulating over them.

On the other hand, mining operation is usually performed 24 hours a day, so there are periods of total darkness. Under this condition, cables are more likely to be damaged since their location becomes difficult. Consequently, equipment availability decreases which might cause productivity reduction in the mining operation.

Under these conditions, the feasibility of having power cables that may be localized from afar and especially in darkness by means of light emission or any other signal, is a real contribution to achieve a greater productivity and better safety and working conditions for industrial activity.

Henceforth, mining will be used only as an example of an industry in particular, but it does not mean that the application of the present disclosure will be circumscribed only to this activity The application of this disclosure is not restricted solely to mining or to a particular ore, as well as to any of its exploitation means: open-pit or opencast and/or underground methods. It is neither restricted to mine size: (Large, Medium, and Small Mining) nor to a particular equipment, except those that are powered with low, medium and/or high voltage, with direct or alternating current or voltage (DC or AC).

Understanding the solution as a system that is capable of extracting energy from power cables (606, 801,1201) for various applications, including lighting the cable, then, the requirements that the solution must meet, in some implementations, in order to solve technical problems previously raised, are:

(i) A system that draws energy from the power cable (606, 801,1201) either during the day or in the dark so that that energy is always available for any of its applications. In particular, for lighting functionality, which makes a power cable (606, 801,1201) visible and/or detectable, either during the day or in the dark; from light, sonic and/or telecommunications signals.

(ii) A system that extracts energy from the power cable (606, 801, 1201) at all times that the equipment is connected to the electrical network, so that that energy is always available for any of its applications. In particular, the lighting functionality highlights the power cable for its protection, so the light, sonic and/or telecommunications signal needs to be available at least as long as the equipment powered by such cable, is operating. That is, ideally, not only when current is flowing, but for as long as the wire (606, 801, 1201) is connected, with voltage present.

(iii) A system that draws energy from the power cable (606, 801, 1201) in a reliable and redundant way, so that that energy is available for any of its applications with high availability and probability. In particular, for the lighting functionality, that the cable lighting system (606, 801,1201) is reliable and redundant to the point that the failure of one of its components (due to a cable cut or some internal failure of a part components) does not imply failure of the entire system.

(iv) A system that draws energy from the power cable (606, 801, 1201) that is resistant to the external environment and working conditions, so that that energy is always available for any of its applications. In particular, for lighting functionality, which resists abrasion, as well as exposure to air, water and ultraviolet radiation, typical of the environment in which the cable is used (606, 801, 1201).

(v) A system that extracts energy from the power cable (606, 801, 1201) at all times that the equipment is connected to the electrical network, so that that energy is always available for any of its applications. In particular, for lighting functionality, which does not require external illumination to be visible (reflective).

(vi) A system that extracts enough energy from the power cable, at all times that the equipment is connected to the electrical network, so that that energy is always available for any of its applications. In particular, for lighting functionality, that the signal emitted by the cable (606, 801, 1201) has a sufficient intensity to be detected several meters away, given the dimensions of the field and the machinery.

(vii) A system that draws energy from the power cable (606, 801, 1201) at all times that the equipment is connected to the electrical network, so that that energy is always available for any of its applications. In particular, for lighting functionality, that the signal emitted by the system has the least amount of limitations in terms of signal reception. In the case of a light signal, the cable must be seen without any angle of view limitation (reflective tapes limitation).

(viii) A system that draws energy from the power cable (606, 801, 1201) at all times that the equipment is connected to the electrical network, so that that energy is always available for any of its applications. In particular, for lighting functionality, which does not require an additional and/or external power source other than the power cable (606, 801, 1201) itself.
(ix) A system that extracts energy from the power cable (606, 801, 1201) but that is not electrically connected to the main conductors (101) of the phases (1101, 1401) because, given the high voltage, the insulations or transformers required to avoid an electric arc are of inadmissible dimensions for the operation of a power cable (606, 801, 1201).
(x) A system that extracts energy from the power cable (606, 801,1201), that its implementation in the cable does not imply a considerable increase in its dimensions.
(xi) A system that draws energy from the power cable (606, 801, 1201) and that is restricted to the dimensions of the cable (which is within its same structure). For the particular case of the three-phase medium voltage cable used to power the loading shovel (606), it should comply with the ICEA standard (Insulated Cable Engineers Association) S-75-381-2008, part 3.22, which limits the outer diameter of power cables.
(xii) A system that extracts energy from the power cable (606, 801, 1201), which does not imply a considerable increase in the costs of the same materials used in a cable without lighting technology. Neither a substantial increase in weight or have substantially less flexibility.
(xiii) A system that extracts energy from the power cable (606, 801, 1201) and that the device that allows giving to it a new functionality (606, 801,1201) (light, voltage signal, sound, monitoring of variables, etc.), has a low manufacturing cost.
(xiv) A system that draws energy from the power cable (606, 801,1201), which can be implemented in the cable (606, 801,1201), using current manufacturing techniques and the same machinery available in cable factories.
(xv) That it can be incorporated in as many types of cables as possible and with the least limitation regarding the outer diameter of the cable, given by the combinations of voltage class and cable gauge. In particular, it is not restricted to high-voltage (large-diameter) large-gauge cables, but can also be implemented on smaller-gauge, lower-voltage (smaller-diameter) cables.
(xvi) A system that extracts energy from the power cable (606, 801,1201), whatever the type of energy with which that cable is powered, either with alternating or direct current.
(xvii) A system that extracts energy from the power cable (606, 801,1201), whatever the type of energy with which that cable is powered, whether is low, medium or high voltage.

A solution for such industry-specific problems requires a reliable source of energy, which is achieved by extracting said energy from the cable itself (606, 801, 1201), but indirectly, that is, without making electrical contact with the cable conductors (101). In this way, the cable itself becomes a reliable and self-sufficient power source.

The internal and external power sources present in a cable (606, 801,1201) are:
(i) Electrical energy carried by the power cable (606, 801,1201). The power cable (606, 801, 1201) carries electrical energy in the form of current through its conductors (101), which exists by the voltage between the conductors (101) of its phases (1101, 1401). To extract that energy directly, an electrical connection is required to at least one of the conductors (101) of the phases (1101, 1401) of the cable. This has a series of technical difficulties given the high voltage that can be up to several thousand volts: up to 1,000 volts in low voltage, up to 69,000 volts in medium voltage and up to 500,000 volts in high voltage.

Given the above, electrical insulation is required in the connection and/or the use of transformers which makes this possibility impractical due to the dimensions that would be required within the cable and the lack of safety in the electrical installation.
(ii) Solar and light energy that reaches its surface. External light energy, in combination with existing materials (use of photo-luminescent and reflective materials alone or together), does not provide an effective solution to the problem.

This is because photo-luminescent materials are not capable of delivering enough energy in terms of power (light intensity) and duration. Reflective materials, on the other hand, only reflect incident light, which is diminished by the angle of incidence. Finally, both materials lower their effectiveness due to the opacity produced by abrasion on the outer covering.
(iii) Heat that is generated by current flowing inside the power cable. The current flowing through the cable only generates an appreciable amount of heat when the current density (A/mm2) is high enough, given the ventilation conditions. The cables are designed in such a way that the heat losses are negligible, so this source of energy is not really available nor desirable.
(iv) Magnetic field present by current flowing inside the power cable. This is a source of energy present in a monopolar (single conductor) cable. In fact, there is documentation in this regard: "POWER LINE ENERGY HARVESTING POWER SUPPLY, US 2010/0084920 A1, dated April 2010.

However, the cables that are required to be illuminated and/or highlighted are preferably cables with more than one conductor, without disregarding monopolar ones, in which the currents inside are out of phase (polyphase cables).

For this type of cables, the situation is more complex, for two reasons:

First, to draw power from a cable with more than one conductor inside, a configuration must be used that keeps the cable size (final outside diameter) within an acceptable range. The solution proposed by the patent "POWER LINE ENERGY HARVESTING POWER SUPPLY, US 2010/0084920 A1, dated April 2010, is impractical within a cable with single or more than one conductor, if it is intended to keep the final diameter of the cable within the ranges accepted by the ICEA standard (Insulated Cable Engineers Association) S-75-381-2008, part 3.22, which limits the outer diameter of power cables.

Figure 6:
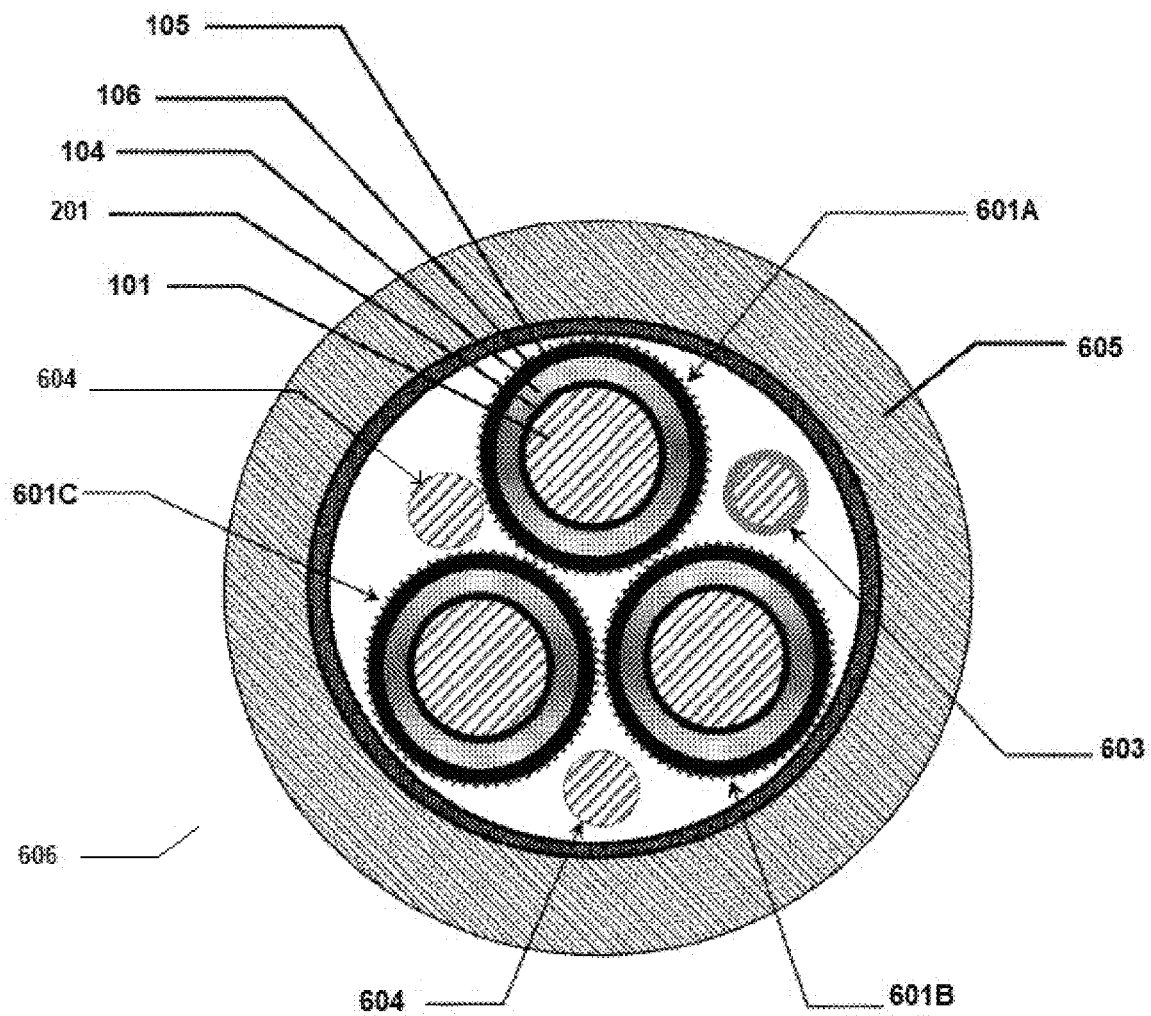
FIG. 6 is an example of a three phase medium voltage power cable.

FIG. 6 shows the traditional medium voltage three-phase power cable (606) that feeds a loading shovel for the Mining Industry. The cable is complex, with several elements and several layers per element.

Second, to extract energy from a medium voltage cable with more than one conductor inside (606), it must be considered the current flow of each of the three phases and the consequent geometry of the magnetic fields generated by each of those currents. The circulation of currents in each of the phases of a three-phase cable (phase shift of 120° between phases), generates a magnetic field on the outer perimeter of this type of cables. However, the phasor sum of the currents is zero, so the magnetic field generated by the three phases together is also zero. Therefore, at first glance, it appears not to be a viable energy source, since, if a toroid-shaped core arranged around the outside perimeter of the cable, it would have zero magnetic flux throughout its volume. Under these conditions, it is not possible to extract power from the cable from a configuration like the one mentioned above.

The energy sources mentioned (electrical energy in both voltage and current, solar and light energy, heat energy and energy from the magnetic field) are presented in ways that are not the most adequate to effectively extract energy from the power cable. In this way, they present certain drawbacks to be considered viable sources for the purpose to be achieved.

Patent application PCT/CL2012/000044 proposes the use of the existing magnetic field due to current flow in each phase (1101, 1401), individually. The subject matter of the present disclosure makes it possible to extract electrical energy from the three-phase cable, phase (1101, 1401) per phase (1101, 1401), without electrical contact with the conductors themselves, thus allowing powering of certain devices that highlight for the presence of the cable (606, 801, 1201) in the ground. The devices can be diverse, such as light emitters, any sonic and/or telecommunications signal (GPS radio frequency, etc.) and power certain remote mechanical devices, without restricting the extraction and application of energy to these applications.

However, the operation of this system depends on the flow of current in order to obtain power from the cable.

v) Electric field (102) present in certain layers of the cable, by the mere fact of being connected to the electrical network and therefore with voltage difference between its phases. When the cable is connected to its power source, normally a mobile electrical substation, there is a voltage between its phases and between each phase and ground. In this way, an 8 kV class cable has a voltage between its phases of 8,000 volts and between phase and ground of 4.6 kV (8/root (3)). This voltage is the result of the presence of an electric field (102) that is oriented radially between the conductor (101) and its grounded screen (105). The electric field (102) has the advantage of being always present, as long as the cable is connected to the electrical network and with voltage.

In this way, the electric field (102) can be used to extract energy from the power cable (606, 801, 1201), storing electrical charge, in order to do something useful with that stored energy. This energy can be used to generate light in the cable (606, 801,1201) or any other useful functionality for the cable (606, 801,1201), with the great advantage of doing so whenever the cable is connected and with voltage applied.

The subject matter of the present disclosure uses the electric field (102) present in the vicinity of the conductors (101) of the cable (606, 801,1201) to generate light inside the power cable (606, 801, 1201) and given the proposed configuration it solves the problems of the prior art, constituting a real solution for the industry, since it satisfies each of the requirements to detect the presence of cables that feed critical equipment.

Alternative fields of application of the subject matter of the present disclosure.

In addition to the fields of application described above (mining and light in the cable), the subject matter of the present disclosure solves problems in various other fields. Hereinafter, certain fields of application will be named, without this implying that they restrict the applications of the subject matter of the present disclosure.

We can classify the fields of application into at least three categories:

I. Location:
　a. Localization of submarine cables: the energy extraction system from the electric field in power cables (701, 1301, 1701, 2401), allows to electrically power a load (404) which in turn allows to locate submarine cables either with signals luminous, sonic, and/or telecommunications.
　b. Location of high-voltage power cable: the energy extraction system from the electric field in power cables (701, 1301, 1701, 2401), allows a load (404) to be electrically powered, which in turn allows, from light, sonic, and/or telecommunications signals, warn the presence of high voltage lines from a distance.
　c. Location of overhead cables in areas close to air traffic: the energy extraction system from the electric field in power cables (701, 1301, 1701, 2401), allows a load (404) to be electrically powered, which in turn allows, from light, sonic, and/or telecommunications signals, warn the presence of high voltage lines from a distance.

II. Lighting and Identification by Lighting.
　a. Underground tunnels: the energy extraction system from the electric field in power cables (701, 1301, 1701, 2401), allows a load (404) to be electrically powered, which in turn allows the identification of cables in underground tunnels by means of different light colors and additionally illuminate the tunnel in question. Additionally, mark the emergency exit route in a network of tunnels.
　b. Urban and rural lighting: the system for extracting energy from the electric field in power cables (701, 1301, 1701, 2401), allows a load (404) to be electrically powered, which in turn makes it possible to illuminate areas close to distribution power lines.
　c. Cable identification: the system for extracting energy from the electric field in power cables (701, 1301, 1701, 2401), allows a load (404) to be electrically powered, which in turn allows differentiating phases (1101, 1401) from others, circuits from each other and even cables from each other, which are laid in trays or ducts next to many other similar cables.

Likewise, the energy extraction system from the electric field in power cables (701, 1301, 1701, 2401), allows a load (404) to be electrically powered, which in turn allows color coding by different colored lights and/or telecommunications signals of, different voltages, cable gauges, cable origins or destinations, etc.

III. Monitoring of Variables and/or Parameters: The energy extraction system from the electric field in power cables (701, 1301, 1701, 2401) allows a load (or sensor) (404) to be electrically powered, which in turn allows:
　(i) to monitor operating variables, (ii) eventually store them and (iii) eventually transmit them as information.

The energy extraction system from the electric field in power cables (701, 1301, 1701, 2401) has the advantage that at the same time that it illuminates the cable, that same light indicates voltage presence in it.

An example of a field of application is the monitoring of variables and/or parameters in electrical transmission and/or distribution networks.

Monitoring the physical elements and power lines of these networks, especially outside an electrical substation, represents a considerable challenge due to the great distances that must be covered, as well as adverse weather and environmental conditions.

A solution for monitoring these parameters is a network of small sensors that transmit the information captured to a monitoring center by wireless telecommunication.

As an example of the parameters that are of interest to monitor in electrical power distribution systems, the following can be mentioned:

a. Those that are outside an electrical substation: voltage and current of certain critical points; the arrow that the catenary of an overhead cable has (minimum distance of the cable from the ground); temperature of the cables that affects their length and conductivity; power; transients and harmonics; phase shifts between current and voltage (power factor), power quality distortions, etc.

b. Those that are inside an electrical substation: temperature of the windings of the transformers; dielectric quality and quantity (level) of transformer oil; gas chromatography transformer line; operating temperatures of switches and other equipment, just to name a few.

Additionally, meteorological and environmental parameters such as pressure, temperature, wind speed, pollution, amount of particulate matter, solar radiation, luminosity levels, etc. can be monitored. Alarm signals to prevent or capture cable theft may also be of interest.

IV. Emission of Sounds to Scare Away Animals on Cables:

The system for extracting energy from the electric field in power cables (701, 1301, 1701, 2401), allows a load (404) to be electrically powered, which in turn allows the generation of audible, subsonic and/or ultrasonic sounds to scare away animals such as birds, rodents, insects.

V. Use of Charge Accumulators (1002):

The energy extraction system from the electric field in power cables (701, 1301, 1701, 2401), allows accumulating electrical energy in elements such as batteries, capacitors, super capacitors, etc.

The stored energy is used to keep powering the loads (404) mentioned in the previous paragraphs, even when no current flows through the main conductor.

The duration of the supply from the accumulators (1002) to each of the loads will depend on the energy consumption of the loads, the capacity of the accumulators (1002) and the relation of the loading and unloading times of each one of them.

Given the various fields of application of the subject matter of the present disclosure, the one that responds to a real and urgent need of the industry is the lighting of power cables (606, 801, 1201). In particular, three-phase medium voltage trailing cables used in open pit mining (606). Thus, in the field of power cable lighting (606, 801, 1201), the technical problems that the subject matter of the present disclosure solves are at least the following 12 named, without these being the only technical problems that the subject matter of the present disclosure solves:

1) Resistance to External Conditions Such as Abrasion, Humidity, Ultraviolet Radiation.

As one of the alternatives of the proposed disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, from copper sheets (402, 403) of a very low thickness (preferably less than one tenth of a millimeter), arranged between certain existing layers of the phases (1101, 1401) of the power cable (606, 801, 1201). In particular the copper sheets are located between any of the electric field control layers (102) of the power cable (606, 801, 1201). This solution is completely circumscribed to the phase of the cable (1101, 1401), below the electrostatic screen (105), therefore, protected by the outer jacket (605, 802) of the cable. In this way, the subject matter of the present disclosure represents an improvement over those solutions that present mechanical problems of resistance to abrasion caused by dragging the cable (606, 801, 1201), such as cables with reflective tapes on the outside, ("cables with reflective Tiger Stripes"). Likewise, issues such as humidity and UV radiation are resolved, thanks to the protection of the outer jacket of the cable.

2) Light Intensity.

The subject matter of the present disclosure proposes harvesting and/or extracting energy from the electric field (102) and/or storing the electric charge in capacitors to use that energy in the emission of light. The intensity of this light is that corresponding to one or more LEDs (light emitting diodes) of high brightness, cold white (light temperature of 6,500 K) of approximately 20 lumens per LED. The intensity of each of these elements is sufficient to be seen from several meters away (more than 100 meters). As an example, in a 300-meters cable will fit between one thousand and five thousand blinking light-emitting elements, with that intensity per LED. This is a substantial improvement over reflective and photoluminescent tape solutions, which have low light intensity.

3) Duration of Light and Independence from Other External Energy Sources.

As one of the alternatives of the proposed subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. Therefore, as long as the power cable (606, 801, 1201) is connected to the electrical network and with voltage present, the light signal will remain on. Additionally, the light signal does not require external sources such as exterior light to emit or reflect light. This is an improvement compared to those solutions that have a short duration of light signal or that require light from the outside, to later be reflected, as is the case of patents No: CL 1705-2009, PCT/IB2009/056024 and US 2010/0282491 A1.

4) Time when Light Signal is Emitted.

A power cord (606, 801, 1201) may or may not be connected to a voltage source. While connected, current may or may not be flowing through its conductors. In this way, the time that the cable is connected to a voltage source will always be longer than the time that current is flowing through it. The subject matter of the present disclosure proposes a power cable (606, 801, 1201) that extracts energy from the electric field (102) to, among other things, emit light during the entire time it is connected to a voltage source. Therefore it will emit light longer than the cable (606, 801, 1201) which depends on the current flow to emit light. This results in that the cable (606, 801, 1201) that is illuminated by voltage is protected for a longer time than the cable (606, 801, 1201) that is illuminated by current. This represents an improvement over patent application PCT/CL2012/000044.

5) Cable Size with Lighting Inside: Cost, Flexibility and Weight.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, starting from copper sheets (402, 403) of a very low thickness (preferably less than a tenth of a millimeter), arranged between the layers of the cable phases. This solution, compared to the previously proposed solutions, represents an improvement since in patent application PCT/CL2012/000044, both the element that uses the current, and the element that emits light, are relatively large compared to a cable phase (1101, 1401) (about 6 mm vs 26 mm). In this way, even when the cable of the patent application PCT/CL2012/000044, with technology inside, complies with the required standards regarding the final diameter (ICEA S-75-381-2008, part 3.22), the cable turns out to be of the order of 10% larger in diameter. This results in higher manufacturing costs, less flexibility and greater weight. These three factors are relevant, the last two being very important in field operations.

6) Reliability.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, from copper sheets (402, 403) totally independent from each other that are repeated in a modular way and of such a length that it allows adding a multiplicity of electric field extracting elements. In fact, as an example, a 300-meters cable could have between a thousand and five thousand light-emitting elements. This gives the system great reliability via multiple redundancies. In this way, the subject matter of the present disclosure represents a solution compared to the patent application PCT/CL2012/000044, since the latter, to be economically viable and reliable (few connections), the system must have very long elements, with lack of redundancy and ultimately unreliable.

7) Need for Repairs.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, from copper sheets (402, 403) totally independent from each other, which are repeated in a modular way and of such a length that it allows adding a multiplicity of electric field extracting elements (102). In fact, as an example, a 300-meters cable could have between a thousand and five thousand light-emitting elements. Given the multiplicity of redundancies and the independence of the elements that compose it, it is not necessary to repair the lighting system, because if one element fails, it does so independently from the rest of the elements. This eventual failure does not affect the lighting system as there would be many other elements emitting light within the cable. The same is true in the event of a cable failure (701, 1301, 1701, 2401). If it were necessary to repair the cable (701, 1301, 1701, 2401), it would not be necessary to repair the affected light emitting element together with the cable (701, 1301, 1701, 2401), since this element can well be discarded without affecting the operation of the lighting system. In this way, the subject matter of the present disclosure represents a solution compared to the patent application PCT/CL2012/000044, since the latter, to be economically viable, must have very long elements, which are necessarily subject to being repaired in the field when the cable fails.

8) Independence from External Energy Sources.

Among the existing solutions to illuminate power cables, there are those that are connected to an external power source. These cables are those commercially offered by Telefonika and Prysmian (Tenax-Lumen). These solutions employ low-power, high-visibility LED strip lights and electroluminescent strips, respectively. However, these solutions depend on an external power source and are therefore unreliable in that connection. Such reliability is hardly possible in the harsh working environment of mining cables. Additionally, they depend on the possibility of connecting the cable lighting system into industrial plugs. Today, these connections do not exist neither in the installed park of industrial plugs, nor in the new industrial plugs.

The subject matter of the present disclosure only requires the connection to the electrical network that the cable must have in order to work as a cable and does not require an additional external source of energy, in parallel to the main connection. Only with the main connection, the energy extraction system from the electric field in power cables (701, 1301, 1701, 2401), allows it to be illuminated. Additionally, it does not depend on a connection in the plugs.

9) Voltage Presence Indication.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. In this way, the subject matter of the present disclosure achieves two objectives at the same time: to illuminate the cable and to give luminous indication of the presence of voltage. This feature is not provided by any other solution existing up to now, being a very relevant contribution in mining operational safety.

10) Cable Cut Lengths do not Present any Restriction.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, based on copper sheets (402 and 403) totally independent from each other, which are repeated in a modular way and of such a length that it allows adding a multiplicity of electric field extracting elements. In fact, a 300-meters cable could have between a thousand and five thousand light-emitting elements. Given the multiplicity of light-emitting elements of the lighting system, the power cable can be cut in any place with no restriction. In this way, the subject matter of the present disclosure represents a solution compared to the patent application PCT/CL2012/000044, since the latter, to be economically viable, must have very long elements, which do not allow the power cable to be cut (606, 80, 1201) anywhere in the cable, without causing damage to the elements that extract energy and their necessary repair. For example, a 300 meters cable, can only be cut in 75-meter sections. If the power cable (606, 801, 1201) is cut elsewhere, the lighting system must necessarily be repaired to make it work again. This represents a limitation of this type of solution and that is why the subject matter of the present disclosure represents a relevant improvement in the simplicity of use.

11) Operation with Direct Voltage/Current (not Alternating Voltage/Current).

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. In this way, the subject matter of the present disclosure represents an improvement compared to patent application PCT/CL2012/000044, since the latter only works with alternating current to cause induction by the time-varying magnetic field. Instead, the subject matter of the present disclosure works with direct and alternating current independently.

12) Cable Size Restrictions (606, 801, 1201) that can be Implemented.

As one of the alternatives of the subject matter of the present disclosure, an energy extraction system based on the electric field is presented. It extracts energy from power cables (701, 1301, 1701, 2401) to illuminate cables, taking advantage of the electric field (102) present in the vicinity of each of the main conductors (101) of a power cable (606, 801, 1201) connected to the electrical network and with voltage present. The solution is a particular configuration, from copper sheets (402, 403) of a very low thickness (less than one tenth of a millimeter), arranged between the electric field control layers of the cable phases. The harvesting elements are of such a small thickness that they do not offer greater resistance to bending and are easily deformed when applied over radius of curvature much smaller than the cables in which they will be finally implemented.

In this way, this solution, compared to the previously proposed solutions, represents an improvement since in the patent application PCT/CL2012/000044 there is a minimum radius of curvature, under which damage occurs in the light-emitting ribbons. Thus, phase diameters under 20 mm (combination of voltage class 8 kV and 1/0 AWG gauge), can lead to damage to the LED light emitting tape when implemented in the phase (1101, 1401) of the cable.

The subject matter of the present disclosure solves the technical problems previously exposed and constitutes a real solution for the industry that satisfies each of the requirements to detect the presence of cables (606, 801, 1201) that power critical equipment and additionally, indicate the presence of voltage in the line using the same light indication.

It should be understood that the subject matter of the present disclosure is not limited to the particular methodology, composites, materials, manufacturing techniques, uses and applications described herein, as these may vary. It should also be understood that the terminology employed herein is used for the sole purpose of describing a particular representation and is not intended to limit the scope and potential of the subject matter of the present disclosure.

We will define insulated power cable as a conductor (generally copper or aluminum) or set of conductors (101) covered by different layers of different insulating or semiconductor materials and a protective outer covering. We can distinguish single-phase low voltage power cables (1201), single-phase medium or high voltage (801), three-phase low voltage or three-phase medium or high voltage (606), these being the most common, but not the only ones possible, but just an example.

We will define phase of an insulated power cable as the main constituent element of a power cable. Starting from one phase, a single-phase cable is built and from several phases, a polyphase cable is built. A phase is a conductor (usually copper or aluminum) or set of conductors (101) covered by different layers of different insulating or semiconductor materials, but which, unlike the power cable, lacks the protective outer covering. In this way, we can distinguish phases of low voltage power cables (1401) and medium or high voltage (1101), these being the most common, but these are not the only ones possible, but only an example.

We will define load (404) as any artifact or electronic circuit that is connected to the sheets of the energy extracting device from the electric field (408). These loads can be electronic circuits, light emitters, sound emitters, telecommunications emitters, etc. The operation of the loads gives the cable (606, 801, 1201) new functionalities.

We will define three-phase power cable (606) as a cable composed of three medium voltage phases (1101). Each phase (1101) is a conductor (101), covered with different layers of different insulating or semiconductor materials. The whole assembly is covered by a protective outer cover (605).

When the expression "connected power cable" is used, it should be understood that a voltage has been applied to two of the conductors (101) of the power cable (606, 801, 1201).

When the term "voltage reference" is used, it should be understood that voltage is not an absolute term, but is the difference in electric potential between two elements, one of them being the "voltage reference". Generally, the term "ground" or "grounded" is used, as an element that is at zero magnitude voltage, this being normally the reference.

We will define as an electric field (region of space in which the electric force interacts), a physical field that is represented by means of a model that describes the interaction between bodies and systems with properties of an electrical nature. It can be described as a vector field in which a point electric charge E of value q undergoes the effects of an electric force F given by the following equation:

$$F=q*E$$

It should be noted that the use, here, in the statement of claims and throughout the text, that the singular does not exclude the plural, unless it clearly implies it in the context. So, for example, the reference to an "element", is a reference to one or more elements and includes equivalent forms known to those who know the matter (the art). Similarly, as another example, the reference to "a step", "a stage" or "a mode", is a reference to one or more steps, stages or modes and that may include sub-steps, stages or modes, implicit and/or supervening.

All the conjunctions used must be understood in the least restrictive—most inclusive—sense possible. Thus, for example, the conjunction "or" should be understood in its orthodox logical sense, and not as an "exclusive or", unless the context or the text expressly requires or indicates it. The structures, materials and/or elements described are to be understood to also refer to those functionally equivalent and thus avoid endless restrictive enumerations.

Expressions used to indicate approximations or conceptualizations should be understood this way, unless the context dictates a different interpretation.

All technical and/or scientific names and terms used here have the common meaning given to them by an ordinary person, qualified in these matters, unless otherwise expressly indicated.

Methods, techniques, elements, equipment and materials are described although methods, techniques, elements, equipment and materials similar and/or equivalent to those described may be used or preferred in the practice and/or tests of the subject matter of the present disclosure.

The structures described herein should also be understood to refer to any similar or functionally equivalent structure.

The dimensions, values, units (in general quantities) that are given in the descriptions of this text are only referential and are given as examples, but do not restrict the subject matter of the present disclosure only to those quantities.

All patents and other publications are incorporated by reference, for the purpose of describing and/or informing, for example, the methodologies described in such publications, which may be useful in connection with the subject matter of the present disclosure. These publications are included only for their information prior to the date of registration of this patent application.

In this regard, nothing should be considered as an admission or acceptance, rejection or exclusion, that the authors and/or inventors are not legitimated to be, or that such publications are dated by virtue of previous ones, or for any other reason.

The subject matter of the present disclosure includes a system for extracting energy from the electric field in power cables (701, 1301, 1701, 2401), taking advantage of the electric field (102) present in the vicinity of each of the main conductors (101) of a power cable (606, 801, 1201) connected to the electrical network and with voltage present. The system comprises an insulated power cable (606, 801, 1201), of one or more phases, of low, medium or high voltage; and a device for extracting energy from the electric field (408), with its different uses.

The subject matter of the present disclosure includes a system for extracting energy from the electric field in power cables (701, 1301, 1701, 2401), taking advantage of the electric field (102) present in the vicinity of each of the main conductors (101) of a power cable (606, 801, 1201) connected to the electrical network and with voltage present. The cable has one or more phases and has incorporated at least one device for extracting energy from the electric field (408), such as the one mentioned above and its different uses.

The subject matter of the present disclosure includes a system for extracting energy from the electric field in power cables (701, 1301, 1701, 2401), taking advantage of the electric field (102) present in the vicinity of each of the main conductors (101) of a power cable (606, 801, 1201) connected to the electrical network and with voltage present. The cable is connected to a direct voltage and has incorporated at least one device for extracting energy from the electric field (408), such as the one mentioned above and its different uses.

The subject matter of the present disclosure includes a system for extracting energy from the electric field in power cables (701, 1301, 1701, 2401), taking advantage of the electric field (102) present in the vicinity of each of the main conductors (101) of a power cable (606, 801, 1201) connected to the electrical network and with voltage present. The cable is connected to an alternating voltage and has incorporated at least one device for extracting energy from the electric field (408), such as the one mentioned above and its different uses.

The subject matter of the present disclosure includes a system for extracting energy from the electric field in power cables (701, 1301, 1701, 2401), which also allows the accumulation of the extracted energy by means of batteries, capacitors, super capacitors, etc. and its different uses.

The subject matter of the present disclosure includes a device for extracting energy from the electric field (408), such as the one mentioned above.

The subject matter of the present disclosure includes the manufacturing process of the energy extraction system from the electric field in power cables (701, 1301, 1701, 2401). The process contemplates incorporating in the power cable (606, 801, 1201), in one or more phases, the device for extracting energy from the electric field (408) and/or the previously mentioned accumulation device and its different uses.

The subject matter of the present disclosure includes the repair of power cables (606, 801, 1201) that do not have the device for extracting energy from the electric field (408), incorporated from the origin, therefore, that allows the incorporation of the device for extracting energy from the electric field (408) and/or the aforementioned accumulation system and its different uses.

Medium voltage power cables (606, 801, 1201) are constructed in such a way that each of their layers plays a particular role. In general terms, the functions of the different layers are: (i) to conduct electric current; (ii) control the electric field or isolate; and (iii) mechanically protect the cable.

Figure 2:
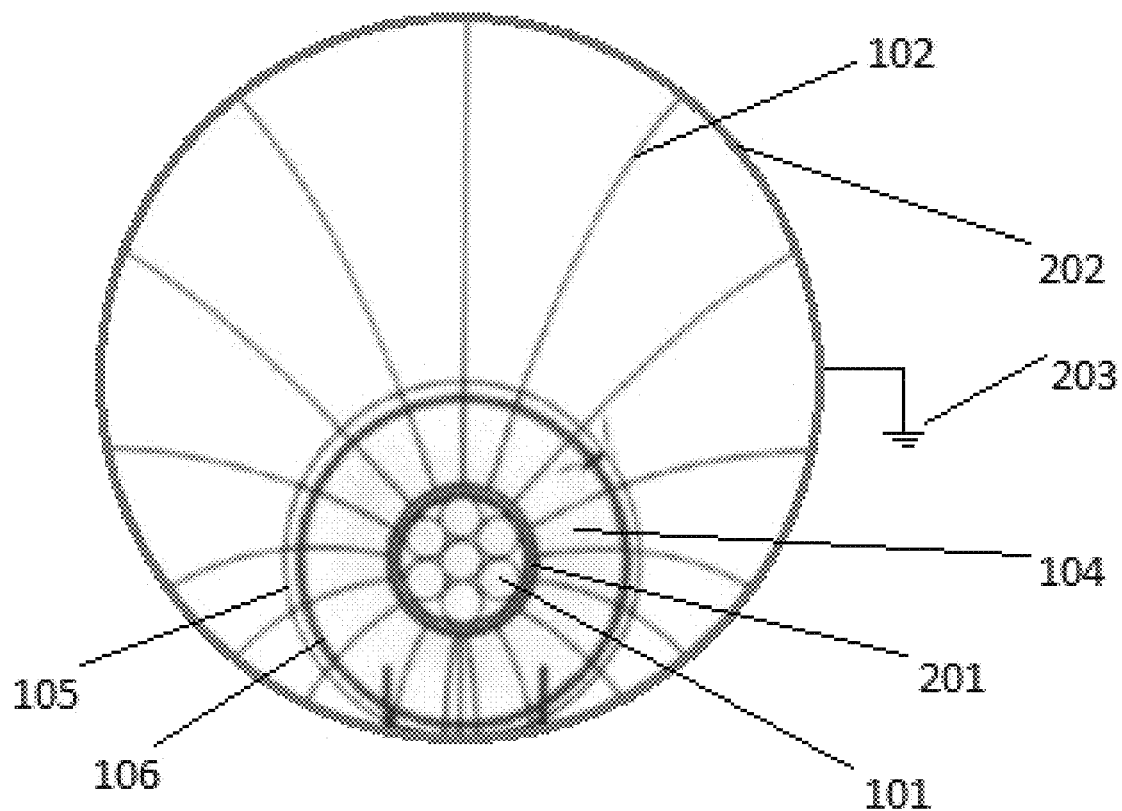
FIG. 2 shows a section view of the phase of an example of a medium voltage electric cable (1101), which has a voltage applied to its conductor (101), relative to ground (203).

FIG. 2 shows the cross section of a phase (1101, 1401) of a medium voltage cable (606, 801) with all its layers, circumscribed by the last layer: the electrostatic screen (105). In this case, the electrostatic screen (105) is not grounded and the radial electric field lines (102) escape from it, always looking for the voltage reference equal to zero (ground, (203)). This physical effect is closely related to the design of medium voltage electric cables (606, 801), since the control of this electric field is vital for its proper functioning, in terms of performance and safety.

As can be seen in FIG. 2, the radial electric field lines (102) are not 100% controlled by the primary insulation of the cable (104). This means that the voltage on the outer surface of the primary insulation (104) is not of zero magnitude. In this way, a greater thickness of insulation would be necessary to control this radial electric field (102) at 100%. This implies a cable of greater dimensions, of greater cost, greater weight and less flexibility.

However, cable manufacturers have solved the problem by forcing the voltage on the outer surface of the primary insulation (104) to zero. In this way, a great thickness of primary insulation (104) is not necessary, achieving more compact, more flexible and less expensive cables. This is of particular relevance in the flexible trailing cables (606) used in mining, since to be flexible they must be made of special materials, but also small in diameter.

Medium voltage power cables (606, 801) with small external diameter are achieved with a small thickness of primary insulation (104), thanks to the electrostatic screen (105) being grounded. This can be seen in FIG. 3, in which the radial electric field lines (102) are confined by the electrostatic screen (105), grounded thanks to its connection to earth (203). In this way, on the outer surface of the primary insulation (104) there is a voltage, given by the radial electric field (102), not yet 100% controlled, and at the same time, there is a voltage of zero magnitude, since that outer layer of the primary insulation (104) is in contact with the grounded electrostatic screen (105). This implies that in that outer layer of the primary insulation (105) there would be a sudden voltage transition from a certain magnitude to a zero magnitude. However, in nature, abrupt transitions tend not to exist since doing so usually generates stress concentration points and materials damage.

In this case, forcing the outer surface of the primary insulation (104) to zero magnitude due to grounding (203) would mean a transition from a voltage of a certain magnitude to a zero magnitude in a tiny space. That would generate concentration of electrical stresses in the insulation, damaging it over time. That is why there is a transition element that is the outer semiconductor layer (106). In said semiconductor layer, a voltage magnitude transition occurs, decaying through its thickness, from the outer surface of the primary insulation (104) to the grounded electrostatic screen (105).

Then, thanks to the outer semiconductor layer (106) the cable is "discharged" to ground.

The subject matter of the present disclosure takes advantage of this potential difference between the external semiconductor layer (106) and the grounded electrostatic screen (105), in such a way that the cable (606, 801, 1201) is discharged through the loads (404) that are arranged between the sheets that constitute the device for extracting energy from the electric field (408).

The construction of the device for extracting energy from the electric field (408) is composed of: (i) an electrically conductive sheet (402) that extracts the radial electric field (102) and is in contact with the outer semiconductor (106). This sheet is the inner sheet (402), since it is towards the inside of the conductor; (ii) a second electrically conductive sheet (403) that is in electrical contact with the grounded electrostatic screen (105). This sheet is the outer sheet (403) since it faces the outside of the conductor. In this way, the electric field (102) captured by the internal harvester sheet (402) is directed from the circuits or charges (404), towards the grounded electrostatic screen (105).

The energy extraction system in power cables, from the electric field is (701, 1301, 1701, 2401):
  (i) A system for extracting energy from the electric field in power cables (701, 1301, 1701, 2401), from a power source (the same power cable (606, 801, 1201)), without making direct contact with the conductors (101) of the cable, to give any of the functionalities that are intended to be given to the power cable (606, 801, 1201).
  (ii) A system for extracting energy from the electric field in power cables (701, 1301, 1701, 2401) that maintains the size of the power cable (606, 801, 1201). That is, it maintains its final diameter within acceptable ranges. For the particular case of the power cable used to feed the loading shovel (606), it must comply with the ICEA standard (Insulated Cable Engineers Association) S-75-381-2008, part 3.22, which limits the outer diameter of medium voltage mining flexible power cables (606).
  (iii) A system for extracting energy from the electric field in power cables (701, 1301, 1701, 2401) that minimally modifies the current manufacturing process of single-phase or polyphase cables (606, 801, 1201).
  (iv) A system that works for alternating current (AC) or direct (DC), considering that today there are both systems.

The system for extracting energy from the electric field in power cables (701, 1301, 1701, 2401) comprises two components. The two components are: one or more phases (1101, 1401) of a power cable (606, 801, 1201) to extract energy from the same power cable (606, 801, 1201), from the electric field (102) and a device for extracting energy from the electric field (408), for each of the phases (1101, 1401) implemented.

The device for extracting energy from the electric field (408), contemplates the use of four basic components with certain materialities and configuration over the cable. The components are:
  1) An internal rectangular sheet (402), electrically conductive, preferably copper, of very low thickness, of the order of tenths of a millimeter, whose surface may vary depending on the functionality given to the cable, but it is in the range around at 50 cm2-500 cm2. This surface is necessary, for example, to light one or more blinking light-emitting diodes of 20-26 lumens that can be seen from more than 100 m away. If more energy is required, a larger surface area should be considered. This internal conductive sheet can be applied to the conductor insulation (104) or to the semiconductor tape (106), in a longitudinal or helical manner. This inner sheet (402) captures the radial electric field (102) between the conductor (101) and the grounded electrostatic screen (105) of the cable (606, 801, 1201).
  2) A second external electrically conductive element (sheet or wire) (403) that makes electrical contact with any element that has a potential difference with the cable conductor. This element is the external voltage reference sheet or wire (403).
  3) An insulating layer (401) that houses the copper sheets by adhesion, fusion, etc., and that has several functions:
    a. It supports and insulates the internal electrically conductive sheet (402) by one of its faces.
    b. It supports and insulates the external electrically conductive sheet (403) by one of its faces.
    c. It separates both conductive sheets so that each one can perform the corresponding function so that the device for extracting energy from the electric field (408) works correctly. In this way, the internal electrically conductive sheet (402) must be towards the inside of the cable, in contact with the semiconductor layer (106) and the external electrically conductive sheet (403) must be towards the outside of the cable, making contact with the grounded electrostatic shield (105) from the cable.
    d. It houses the load (404) and/or the circuit that is connected to each of the conductive sheets, according to FIG. 4.
    e. It insulates the outer semiconductor layer (106) from the grounded electrostatic screen (105), allowing the correct operation of the energy extraction system from the electric field in power cables (701, 1301, 1701, 2401). This is relevant, because if there is this electrical contact, the cable is "discharged" through the external semiconductor layer (106) directly towards the grounded electrostatic screen (105), and not through the loads (404), so the loads (404) stop receiving the harvested energy and the loads (404) stop working.
    f. It allows the separation (407) of the unitary extractor devices (inner sheet (402), outer sheet (403) and loads (404)). This separation (407) is relevant since each sheet must have a certain surface of the outer semiconductor layer (106) free to extract electric field (102). In this way, if the internal harvester sheets (402) are very close to each other, they interfere between them and the loads (404) do not receive electrical energy constantly.

g. It allows all the unitary extractor devices (inner sheet (402), outer sheet (403) and loads (404)) to form a single element that is the device for extracting electrical energy from the electric field (408).

4) Loads (404) that are determined by any of the possible new functionalities for the power cables (701, 1301, 1701, 2401). For example, cable lighting, broadcasting of telecommunication signals, sound signals, etc.

5) Accumulators (1002). The energy extracted from the cable can be previously accumulated by batteries, capacitors and/or super capacitors before being consumed by the respective loads and their different uses.

As seen in FIG. 4, the inner harvester sheet (402), the outer sheet (403) and the loads (404) are attached to the tape (401) so that all the independent elements (modular devices) behave physically as a single element, this being the device for extracting energy from the electric field (408). This makes it possible to incorporate it into the cable at the time of its manufacture, using the same machinery that cable manufacturers now have, simply adding one more stage to the cable manufacturing process.

Figure 9:
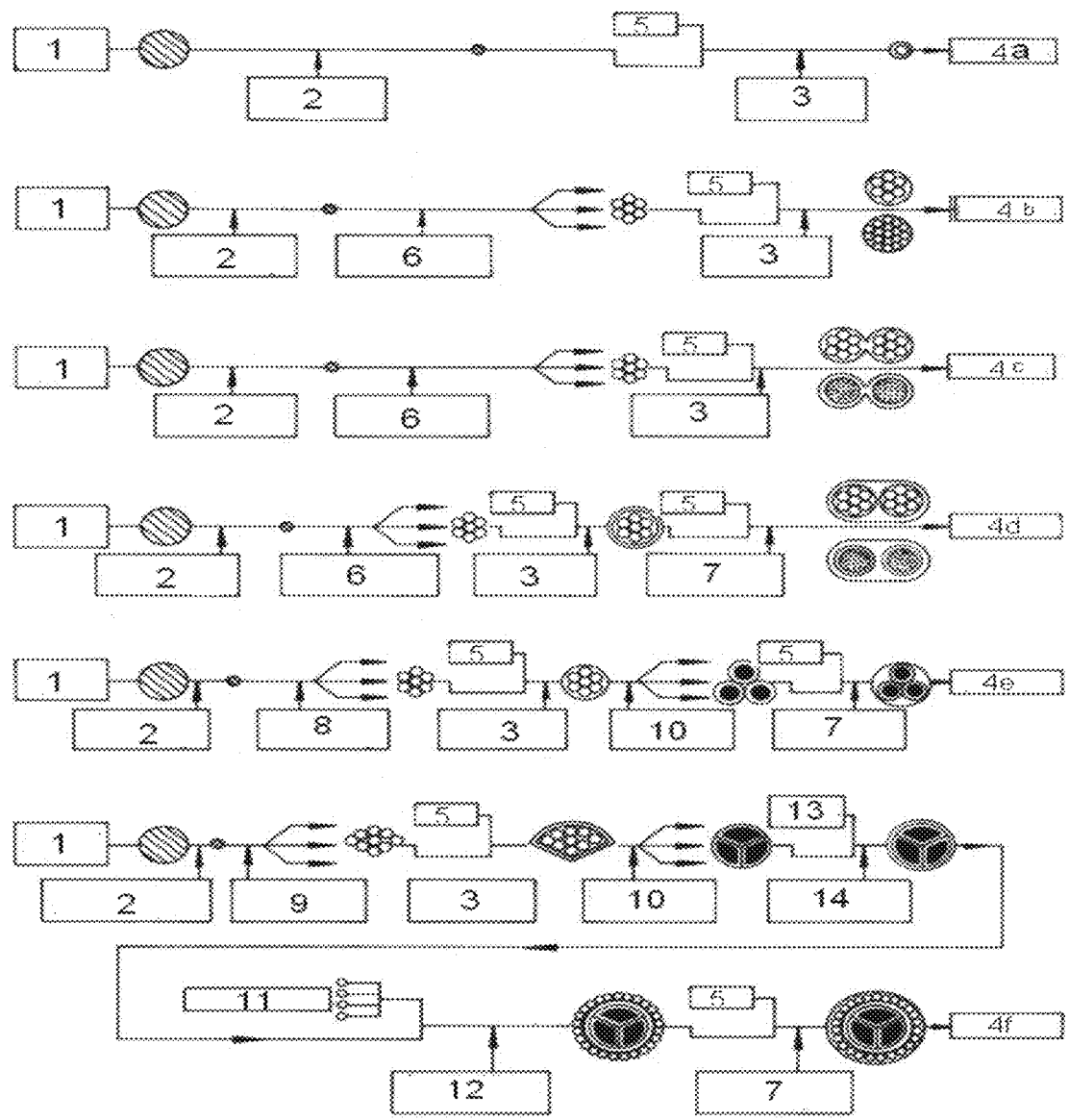
FIG. 9 is a diagram of an example of different cable manufacturing processes.

To incorporate the energy extraction device from the electric field (408) to a polyphase power cable, basically the same machinery and procedure in force in any electrical cable factory is used. This technology is the same as that used for the formation of cables, wires and ropes and has been available for more than 50 years. FIG. 9 shows the generic procedure for the manufacture of different types of cables. The source in part of this procedure is described on the website: http://turnkey.taiwantrade.com.tw/en/Content.aspx?ID=65, although this procedure is not restricted only to this source, as it is widely disseminated on the internet.

Regardless of the type of material, be it silk threads, polyester filaments, iron wires, copper wires, sewing thread, etc., the technology used to hold several thin elements together is known (with respect to the final diameter that will be obtained) that are intended to form a single new element, made up of several with a smaller diameter or section.

The process includes feeding each one of the elements that constitute the new element, and as the elements are put together, both (or more) elements are turned, twisting them on the longitudinal axis of the set itself, leaving all the elements wound on the longitudinal axis.

After joining them and twisting them helically, around the longitudinal axis of the set of elements, they are wound on spools or balls.

The twisting and winding process can be done from two or more elements, which can then become elements of a new twisting and winding process, and so on until the desired final product is obtained, made up of as many elements as required.

This process is the basis for manufacturing cables and the incorporation of the device for extracting energy from the electric field (408) proposed to extract energy from a polyphase cable. So it fits perfectly with current technology for forming cables, wires and ropes.

In this way, the manufacturing process of the energy extraction system based on the electric field in power cables (701, 1301, 1701, 2401) is detailed below, and as part of the subject matter of the present disclosure, which is composed of an insulated cable (606, 801, 1201) with the device for extracting energy from the electric field (408), incorporated between its electric field control layers (102).

Figure 25:
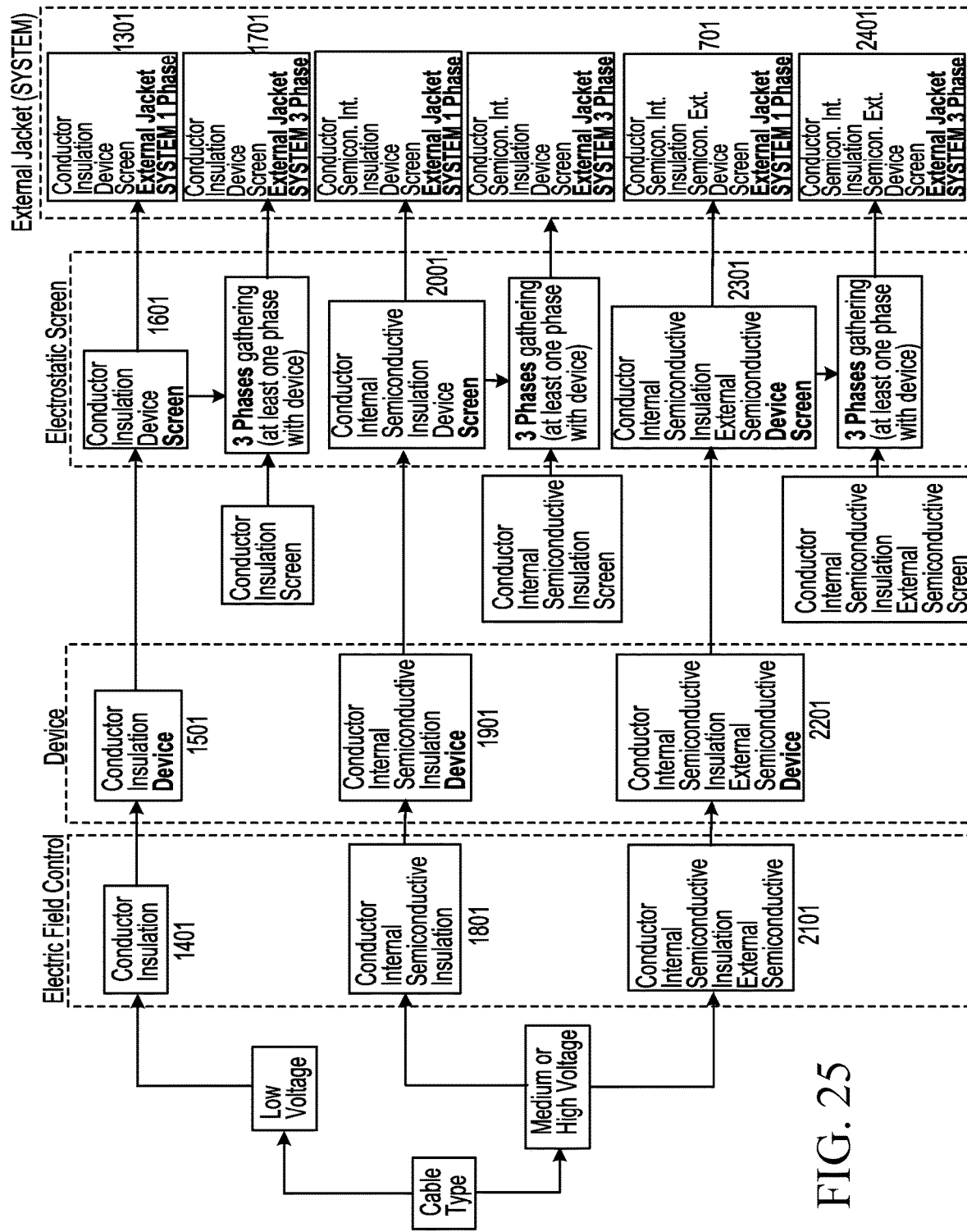
FIG. 25 details an example of the manufacturing process of energy extraction systems from the electric field in single-phase and three-phase power cables, for low, medium and high voltage.

The cable manufacturing process with each one of the stages and the elements involved is summarized in FIG. 25, which outlines the most frequent cases of manufacturing the energy extraction system in power cables, from the electric field (701, 1301, 1701, 2401). These cases are not the only ones in which the device for extracting energy from the electric field (408) can be incorporated into an insulated cable (606, 801, 1201).

Figure 7:
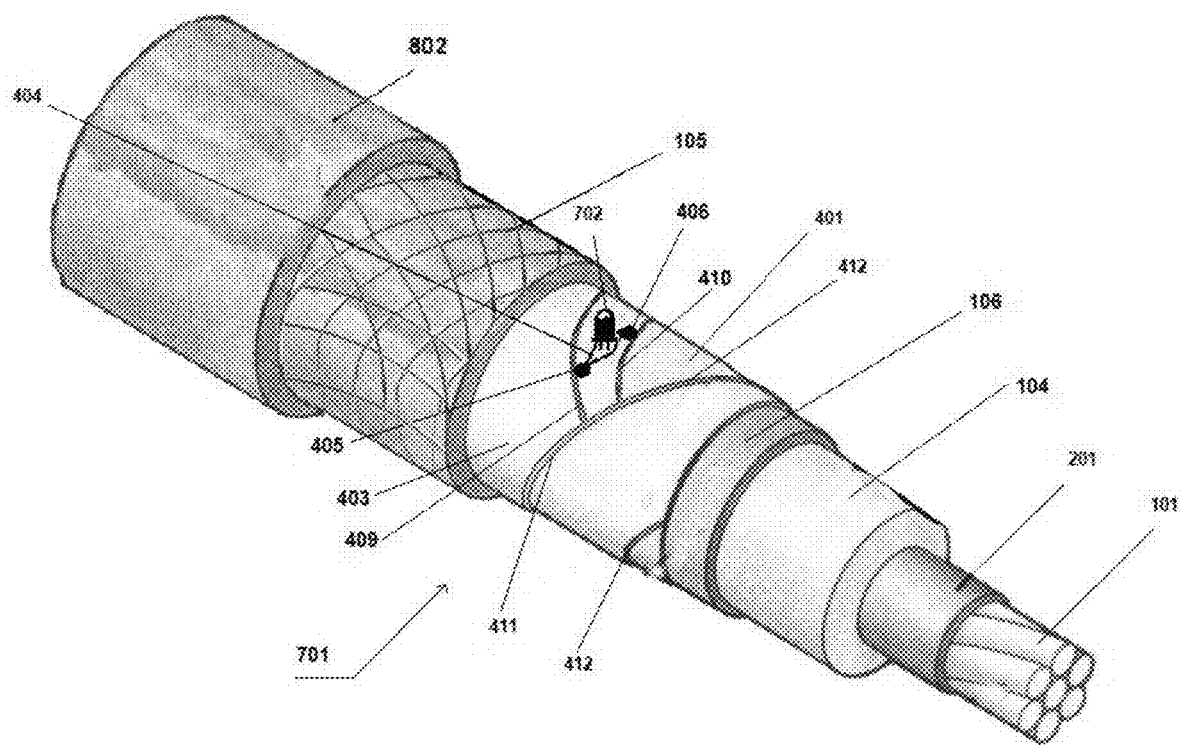
FIG. 7 shows an example of a system for extracting energy from the electric field in single-phase cables of medium or high voltage (701), whose device for extracting energy from the electric field (408) has been incorporated helically on the outer semiconductor layer (106).

FIG. 25 details the manufacturing process of energy extraction systems from the electric field in single-phase and three-phase power cables, for low, medium and high voltage, and details the cases in which the energy extraction device from the electric field (408), it is applied on the primary insulation (104) and on the outer semiconductor layer (105). Thus, in FIG. 25, 6 systems for extracting energy in power cables from the electric field are detailed, 4 of which are described in the figures: FIG. 7 (701), FIG. 13 (1301), FIG. 17 (1701) and FIG. 24 (2401).

Figure 11:
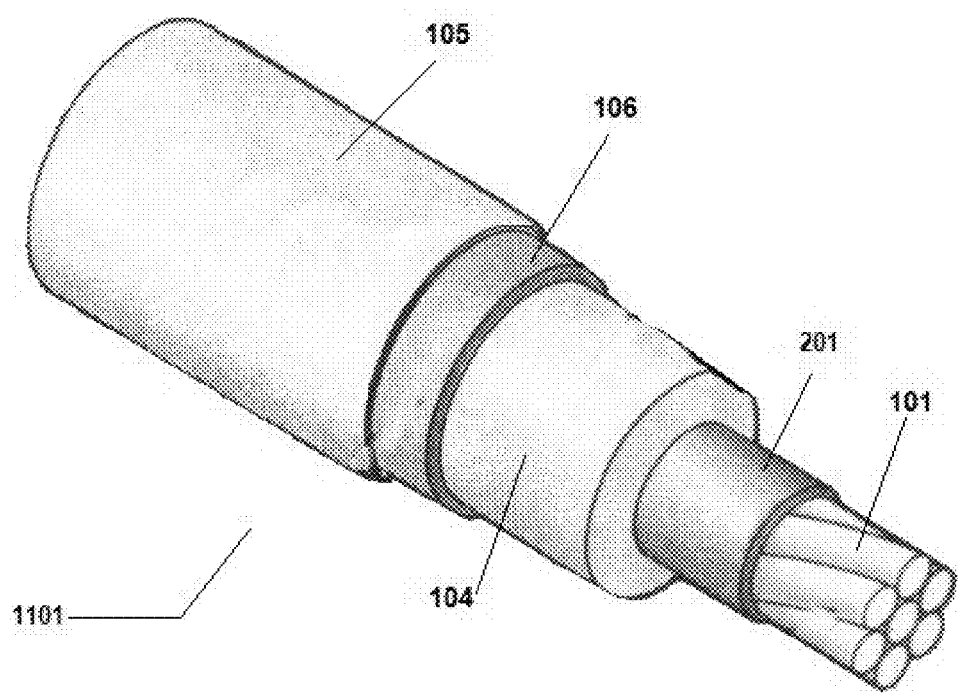
FIG. 11 shows an insulated phase (1101) of an example of a medium voltage electrical cable (single phase (801) or three phase (606)).

1. The first step in the manufacturing process of the energy extraction system, from the electric field in power cables (701, 1301, 1701, 2401), is to define the gauge (diameter) of each of the conductors (101) that constitute the power cable (606, 801,1201), according to its specification. From wire rods (in the case of rigid cable) or wires of smaller diameter (in the case of flexible cable), each of them originally on a reel, they are grouped into a single conductor (101), composed of wires that they have been bundled and twisted helically, giving the conductor the corresponding gauge, according to the specification of the power cable. FIG. 11 shows a phase (1101) of a three-phase medium voltage power cable (606). The conductor (101) is made up of 7 rods.

Each one of the conductors (101), which, at this stage of the process, correspond only to the bare conductor, are left wound on a new reel, larger than any of the previous ones.

Figure 14:
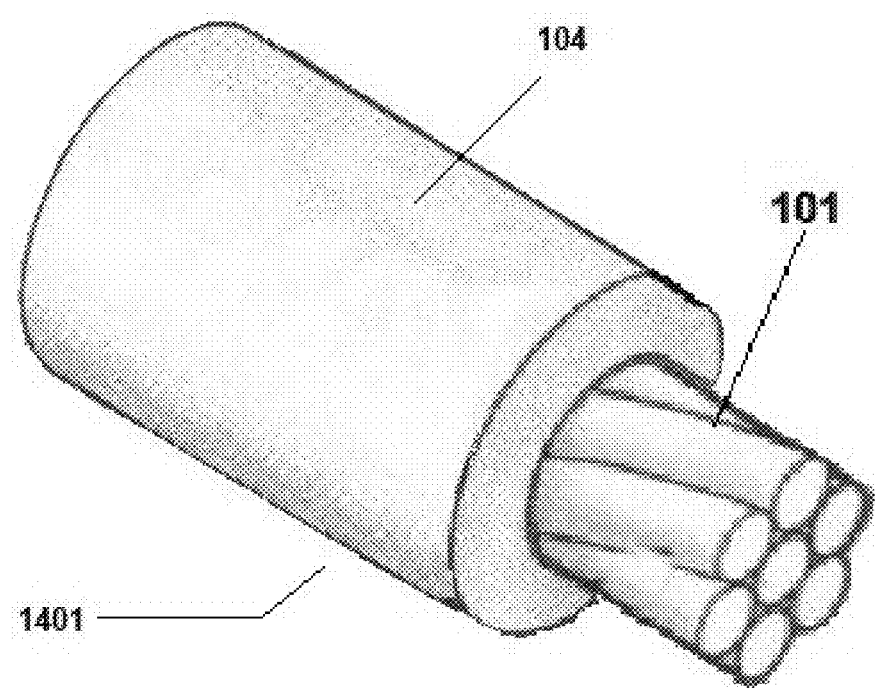
FIG. 14 shows a phase of an example of a low voltage cable, composed of a conductor (101) with its primary insulation (104).

2. Then, for low voltage power cables (1201), to each of the cable conductors (101) the primary insulation (104), necessary to lower the electric field intensity, is added by extrusion. FIG. 14 shows the conductor assembly (101) with its respective primary insulation (104). Each of the already insulated conductors (101) are left on a new spool.

3. For medium and high voltage power cables (606, 801), to each of the phases (1101) of the power cable (606, 801) (FIG. 6, numbers (601A, 601B and 601C)) is added by extrusion or application of tapes, each of the layers that control the electric field:
   a. Inner semiconductor layer (201).
   b. Primary electrical insulation (104).
   c. Outer semiconductor layer (106).

Figure 18:
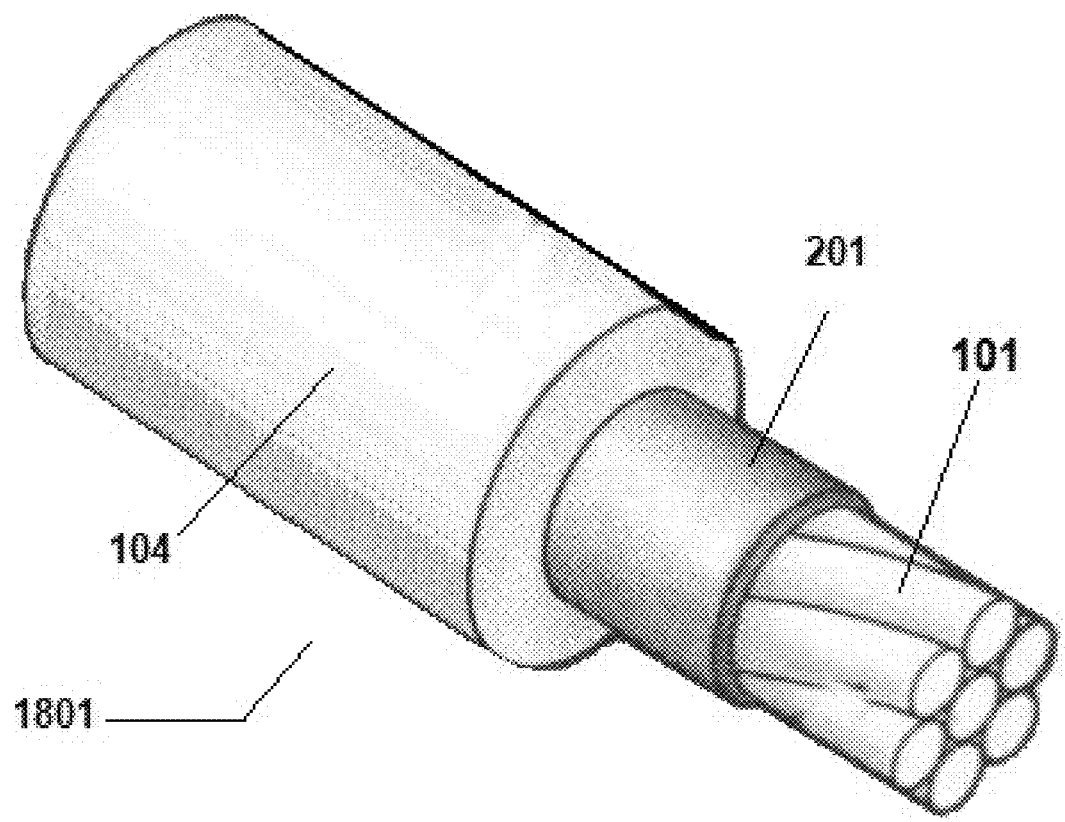
FIG. 18 shows an example of a conductor (101), with its internal semiconductor (201) and with its primary insulation (104).
Figure 19:
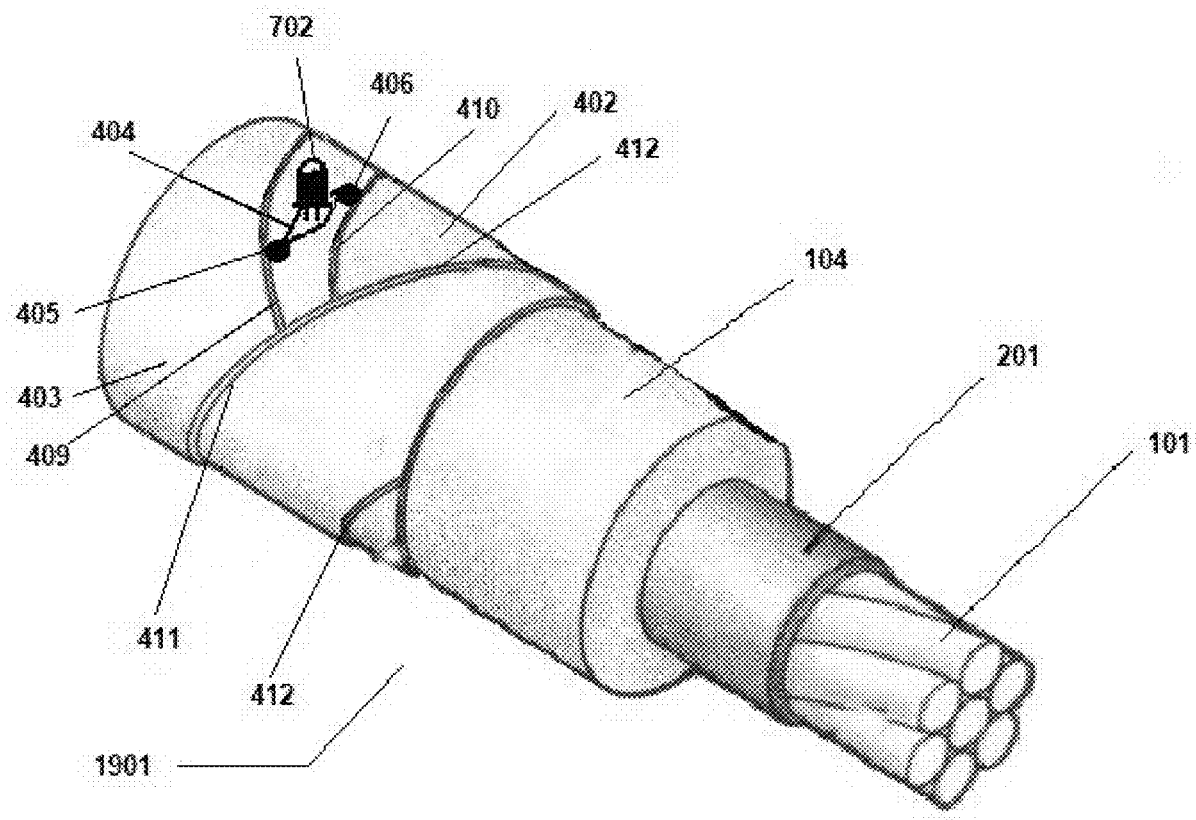
FIG. 19 shows an example of a conductor (101), with its internal semiconductor (201), with its primary insulation (104) and whose device for extracting energy from the electric field, has been incorporated helically over the primary insulation (104).
Figure 21:
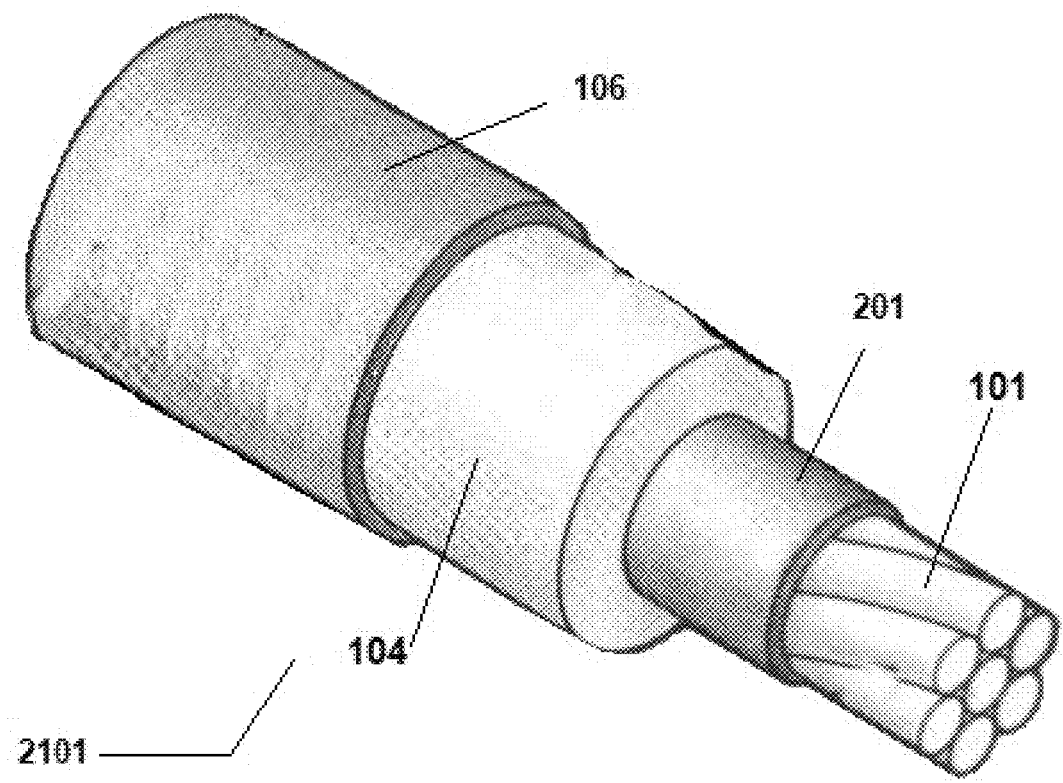
FIG. 21 shows an example of a conductor (101), with its inner semiconductor (201) with its primary insulation (104) and its outer semiconductor layer (106).

FIGS. 18, 19 and 21 show the medium voltage or high voltage cables in this manufacturing stage (1801, 1901, 2101).

4. In case the power cable is medium voltage (606, 801), the device to extract energy from the electric field (408) must be installed on the primary electrical insulation (104) of the conductor (101), FIG. 19 (1901) or on the outer semiconductor layer (106), FIG. 22 (2201). If the cable is low voltage, it will only be applied on the primary insulation (104) of the conductor (101), FIG. 15 (1501).

The internal conductive copper sheet (402) that harvests the electric field (102) must remain in contact with the primary insulation (104) or the external semiconductor (106), as the case may be. If the internal conductive copper sheet (402) that harvests the electric field (102) remains in contact with the external semiconductor tape (106), care must be taken that all the external semiconductor tape (106)

is insulated from the electrostatic shield (105). This can be achieved in several ways, without them being the only ones possible:
  (i) Applying the device to extract energy from the electric field (408), in an helical way, taking care of having a pitch small enough so that the set of tapes of the device extracting energy from the electric field (408), covers the entire surface of the external semiconductor tape (106), leaving nothing of it uncovered;
  (ii) Applying the energy extracting device from the electric field (408), longitudinally or helically with a very long pitch and an insulating tape in parallel, taking care that both tapes (energy extracting device from the electric field (408)) and insulating tape) cover the entire outer semiconductor tape surface (106), leaving nothing of it uncovered.

The correct operation of the energy extraction system from the electric field in power cables (701, 1301, 1701, 2401), allows areas of external semiconductor tape (106) to be in direct contact with the grounded electrostatic screen (105), but the energy that will be harvested in the vicinity of the contact areas of the external semiconductor tape (106) and the grounded electrostatic screen (105), by the energy extracting device from the electric field (408), will be substantially less.

The device for extracting energy from the electric field (408), has a multiplicity of internal electric field harvesting elements (402), on a continuous element (401) and already has each of the loads (404) incorporated and optionally, accumulators (1002) of electrical charge, all this determined by the specification of the cable. This specification determines the distance (407) between the internal electric field harvesting elements (402), the type of load and the type of accumulators (1002) considered.

The device for extracting energy from the electric field (408) is on a reel, waiting to be incorporated into each of the phases indicated by the cable specification.
  5. The device for extracting energy from the electric field (408) is incorporated in at least one of the phases of the cable (FIGS. 7, 13, 17, 24), in such a way that the path over the phase is helical or longitudinal. Either of these two alternatives is possible for the operation of the energy extraction system from the electric field in power cables (701, 1301, 1701, 2401) and the application form will be determined by the cable specification. Each of the phases with the device for extracting energy from the electric field (408), incorporated, is wound on a new independent reel in phases.
  6. On the device extracting energy from an electric field (408) the electrostatic screen (105) is applied to ground. Each of the phases with all its layers, remains on a new reel. This can be seen in FIGS. 16, 20, 23.
  7. All the phases that have incorporated the device for extracting energy from the electric field (408), with the ground cables (604), the ground check wire (603) are brought together. The set is twisted helically, forming a single set and wound on a new spool.
  8. From all the phases that constitute the cable, by extrusion, the outer jacket is added to the cable (605), taking care that if the loads (404) of the energy extraction system from the electric field in cables of power (701, 1301, 1701, 2401), are elements that emit light, the outer cover must be translucent and transparent. The system for extracting energy from the electric field in power cables (701, 1301, 1701, 2401), is already finished and is wound on its final reel, it can be cut to any length.

The manufacturing process of the energy extracting device from the electric field (408), comprises the following stages:

In this section, as well as in other sections throughout the text, shapes (rectangular), surfaces (mm2, cms2), light intensities (lumens), and attachment modes (adhesion, fixation) are mentioned, only by way of example and for clarity in explanations and descriptions. The forms, attachment modes and values of these explanations will depend on the cable specification.
  a.—An internal electrically conductive rectangular sheet (402), preferably copper, with a surface between 50 cm2 to 500 cm2 and a thickness of tenths of a millimeter. This surface exposed to the electric field (102) is capable of harvesting it, making available the necessary energy to power a 20-26 lumen light emitting diode intermittently. If more energy is required, a larger surface area should be considered. The number of sheets can be as high as needed.
  b.—The internal electrically conductive sheet (402) is applied on one of the adhesive faces of the insulating tape (401) with adhesive on both sides (double contact), in such a way that one of the faces of the entire conductive sheet is insulated. The other face of the internal electrically conductive sheet (402) must be exposed (bare), since that exposed face is the one that will harvest the electric field (102). This first internal conductive sheet (402) is the one that will harvest the electric field (102) on the primary insulation (104) of the conductor (101) or on its external semiconductor (106), as the case may be. The purpose is to adhere the internal conductive sheet (402) to the insulating sheet (401) so it can also be done by fusion of both, or by printing methods. This observation is also valid at the different manufacturing steps.
  c.—On the other adhesive side of the insulating tape (401) a second sheet, external electrical conductor (403) is applied, which will remain in electrical contact with the electrostatic screen (105) grounded on the cable. In this way, one of the faces of this second sheet (403) will be in contact with the insulating tape (401) and the other face will be exposed (bare), ready to make contact with the grounded electrostatic screen (105) of the cable.
  d.—The spacing (407) between the harvesting sheets (402) of the electric field (102) when placing a series of harvesters, one after the other, will depend on the functionality given to the cable (801). As an example, the spacing (407) that is required to extract enough power to turn on high brightness blinking LEDs is of twice the length of the energy harvesting tape (402).
  e.—Between both internal and external conductive sheets (402 and 403) the loads (404) must be connected that allow the desired functionality for the cable (801), from the harvested energy.
  d.—All the above elements are joined with insulating tape (401), in such a way that all the elements behave as if they were one single element. All are left on a reel to facilitate their application on the cable phase.

According to the descriptions, both the system for extracting energy from the electric field in power cables (701, 1301, 1701, 2401), in a polyphase cable configuration, and the device for extracting energy from the electric field (408), as its manufacturing process and incorporation into a cable, the characteristics of the subject matter of the present disclosure:
  1) It is in line with current power cable manufacturing methods (606, 801, 1201). That is, the incorporation of technology in the manufacturing process of any insulated cable (606, 801, 1201), considers the same equipment currently installed in cable factories and the same current manufacturing techniques.

2) Maintains the size of the insulated wire (606, 801, 1201) (final outside diameter) within acceptable ranges for use.

3) It is in itself a source of energy, which requires only the connection to the voltage source of the insulated cable (606, 801, 1201) for its correct operation.

4) The device that extracts energy from the electric field (408) does not make electrical contact with the conductors (101), as it is applied over the primary insulation (104) or over the internal semiconductor (201) or over the external semiconductor layer (106), depending on the specification of the power cable.

5) It is powered only with the energy from the electric field (102) available outside of each of the phases of the power cable, and can be implemented in one or more phases.

6) It only requires that the implemented phase be connected to a voltage source. As the cables power up equipment that operate 24 hours a day, and these are always connected, then the energy extraction system in power cables from the electric field (701, 1301, 1701, 2401), is a permanent source of energy.

7) The device that extracts energy from the electric field (408) is modular. That is, the set of devices that extract energy from the electric field (408), are mounted on the power cable helically or longitudinally, and work in such a way that a device that extracts energy from the electric field (408), acts independently of the rest of the devices that extract energy from the electric field (408). All the devices that extract energy from the electric field (408) can belong to the same unit (to the same insulating tape (401) that joins them), which facilitates their incorporation into the power cable (606, 801, 1201), but they work independently from each other. This is especially important when facing possible damage to a certain section of the power extraction system in power cables from the electric field (701, 1301, 1701, 2401). If the energy extraction system from the electric field in power cables (701, 1301, 1701, 2401) is damaged in any section of the power cable (606, 801, 1201), the rest of the devices that extract energy from the electric field (408) they can continue to operate without problems.

8) Can be used in cables (606, 801, 1201) designed to operate in environments with high mechanical stress. The technology can be incorporated into a power cable inside the outer jacket that protects it, thus it can be used in "Heavy Duty" environments (high mechanical stresses of traction, abrasion, torsion, tearing, underwater, etc.)

9) It can be used in cables that work with direct current (DC) or alternating current (AC). This consideration is important given the increasing generation, distribution and use of direct current systems.

10) As the system for extracting energy from the electric field in power cables from the electric field (701, 1301, 1701, 2401), it obtains energy from the cable whenever it is connected to a voltage source, then, whenever there is voltage presence, the energy extraction system from the electric field in power cables (701, 1301, 1701, 2401) will be able to deliver energy to a load (404) that emits a signal that will indicate the presence of voltage. This is especially important in power grids that must be continuously connected and disconnected without elements indicating the presence of voltage, such as in open pit mining.

Given these conditions, the system for extracting energy from the electric field in power cables (701, 1301, 1701, 2401) proposed and implemented in a power cable, is an important contribution to the industry.

Figure 24:
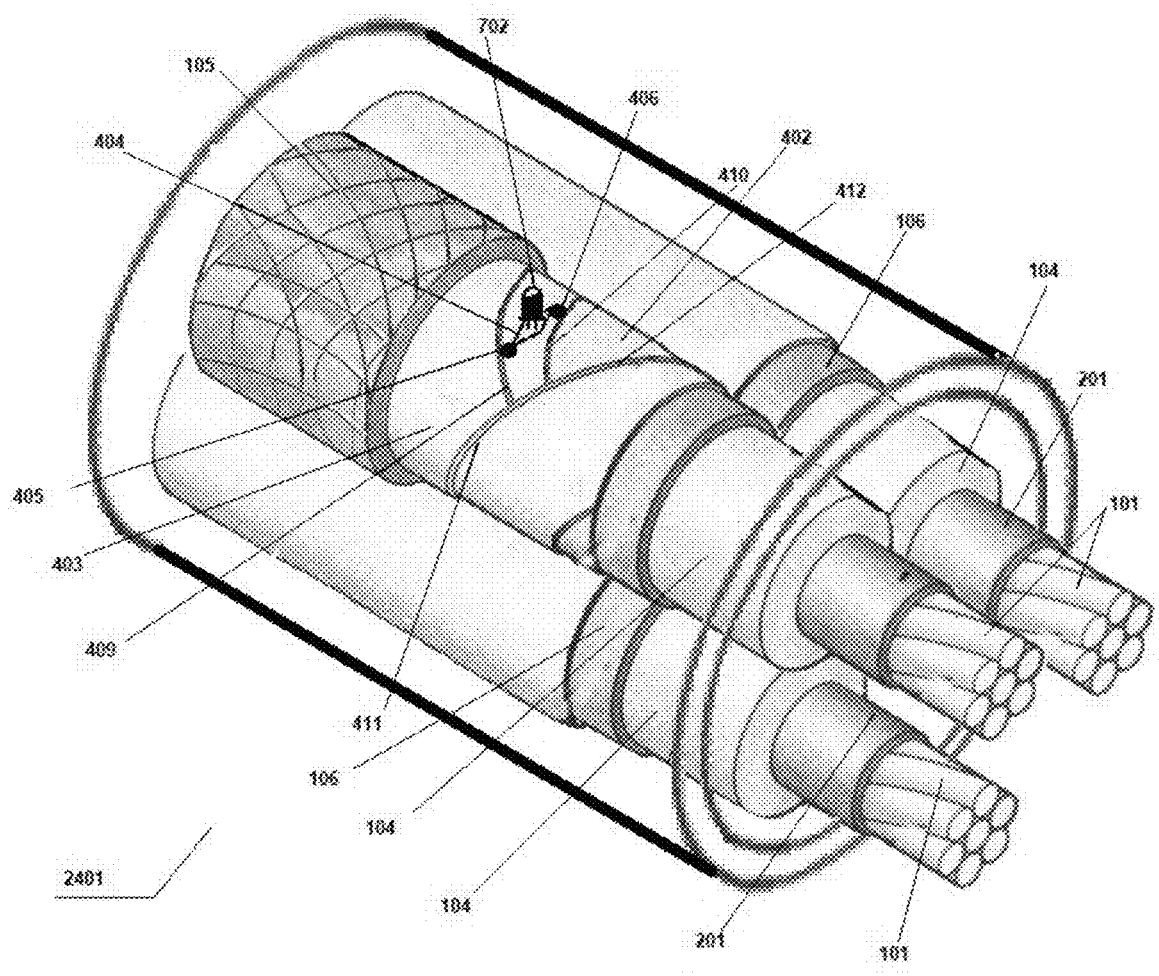
FIG. 24 shows an example of a system for extracting energy from the electric field in three-phase cables of medium or high voltage (2401), whose device for extracting energy from the electric field, has been incorporated over the outer semiconductor layer (106).

The practical example of the application of the energy extraction system from the electric field in power cables (701, 1301, 1701, 2401) was conceived taking into account a three-phase medium voltage power cable (606), which in the FIG. 24 (2401) shows one of its three phases, with the device for extracting energy from the electric field (408), composed of the numbers (401), (402), (403), (404), (405), (406), (407)), incorporated. What is implemented in practice is one of the phases, as shown in FIG. 24. This application example includes a cable whose main function is to illuminate with the application of alternating voltage between its conductors (101) and with its electrostatic screen (105) grounded. Illumination of the cable is achieved since a load (404) containing a light emitting diode (LED) (702) is connected between the contacts (405) and (406).

The cable used is Prysmian brand, and corresponds to a trailing cable, three-phase, medium voltage, class 8 kV, of gauge 4/0 AWG, widely used in production in the large open-pit mining in Chile, to power shovels and electric drilling machines. The cable used has the same configuration as that shown in FIG. 6 (606). From that cable one of the phases (1101) and the electrostatic screen (105) was removed. In this way, the phase remains incomplete, with the semiconductor tape (106) exposed, as shown in FIG. 21 (2101). On the exposed semiconductor tape (106) the device for extracting energy from the electric field (408) is applied in a helical manner. During the application, care was taken that the device covered the entire semiconductor tape, without leaving any area uncovered.

The device was manufactured from 35 mm wide and 0.06 mm thick copper strips. The length of the strips is 200 mm, both for the internal harvesting tape (402) and the voltage reference tape (403). The copper strips were arranged (glued) on an insulating tape (401), reinforced with fiberglass, 48 mm wide, as shown in FIG. 4, in such a way that the harvesting tape (402) is on one side of the electrical tape (401) and the voltage reference tape (403) is on the opposite side. The inner harvester sheet (402) is located below the insulating sheet (401), towards the interior of the cable and is adhered to it.

The separation (407) between each unit device corresponds to 550 mm and it is achieved with the same insulating tape, in such a way that all the unit devices are joined by the insulating tape, forming a single set called the "energy extraction device from the electric field (408)". All these elements constitute the device for extracting energy from the electric field (408) that is repeated in a modular way throughout the entire phase. Circuits made for this practical application were connected to the strips. The contacts between the strips and the circuits are only two and correspond to contacts (405) and (406).

Figure 10:
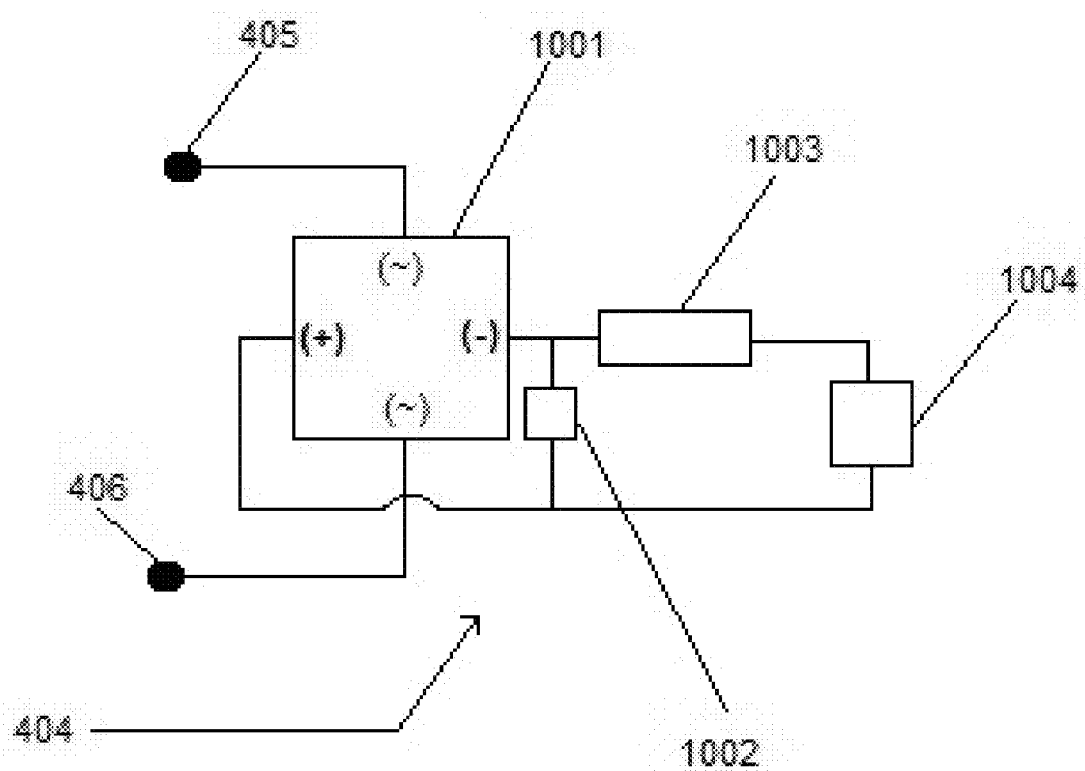
FIG. 10 is a block diagram of a generic circuit, in this case, connected to alternating voltage, representing the load (404) that is connected to the internal harvesting tape (402), at the contact (406) and to the outer sheet (403), at the contact (405).

The circuit is the same as that shown in FIG. 10, in which the rectifier bridge (1001) was built from 4 1N4007 diodes, the capacitor (1002) is electrolytic (with polarity), 4.7 uF and 50V, element (1003) is a DB30 diac and element (1004) is a 3.6V 20 mA high brightness led diode (702) in series with a current limiting resistor of 480 Ohms.

Throughout the entire phase of the cable, there is a multiplicity of energy extraction devices from the electric field (408), repeated in a modular way, independent from each other, but all mounted on the same insulating tape (401). In this way, the device for extracting energy from the electric field (408), has lights (702) every 550 mm and once applied in a helical way without overlapping, the lights (702) are arranged in the phase of the cable each 275 mm, rotating around the perimeter of the phase, as the phase is covered entirely.

The conductors of the cable (101) are connected to an alternating voltage of 8 kV. The voltage is supplied by a TUSAN brand transformer. The electrostatic screen (105) of the cable is grounded, between its conductors there is a potential difference of 8 kV and between each conductor and its screen there is a potential difference of 4.6 kV (8/root (3)).

The inner harvesting tape (402), obtains the voltage of the radial electric field (102) existing by the voltage difference of 4.6 kV between the conductor (101) and the electrostatic screen (105) grounded in the phase. This inner harvester sheet (402), in this particular example, is arranged on the outer semiconductor layer (106) of the cable. That is, the inner harvester sheet (402) is capable of harvesting electric field (102) that still exists on the outer surface of the primary insulation (104) and the outer semiconductor layer (106) of the phase (1101) of the cable of power (606).

For this particular example, the internal harvester sheet (402) is made of 0.06 mm thick copper, whose surface is around 70 cm2 (35 mm wide by 200 mm long). This surface is necessary to light a blinking 20 lumens light emitting diode, which can be seen from more than 100 m away. This inner sheet (402) and the entire device for extracting energy from the electric field (408), is applied on the outer semiconductor tape (106), in a helical shape, with minimal overlap.

Between the contacts (405) and (406) a load is connected that allows generating light. This load is represented by the block diagram circuit in FIG. 10. The alternating electrical energy, coming from the internal harvesting tape (402) is rectified. The rectifier (1001) must also be connected to a reference voltage, given by the ground connection (203) of the electrostatic screen (105). This connection to the reference voltage is achieved since the outer sheet (403) is in electrical contact with the grounded screen (105), therefore, the contact (405) is ground.

The rectifier (1001) converts the alternating voltage into direct voltage and the electric charge from the internal harvesting tape (402) accumulates in the capacitor (1002).

The capacitor (1002) increases the voltage between its terminals as it accumulates more and more electrical charge, until the voltage reaches a trigger value. Once this trigger value is exceeded, the element (1004) allows current flow since it decreases its internal resistance by witnessing a higher voltage between its terminals. Given the above, device 1004 is any element with negative resistance characteristic. It can be a diac or a neon light, etc. In the case of using a neon light, the device (1004) and the device (1003) is a single element, since the neon light emits light and has the characteristic of having negative resistance. In the case of using a light-emitting diode (LED), the device (1004) can be a diac and the device (1003) the light-emitting diode (LED), with its respective current protection resistance.

Throughout the entire phase of the cable, there is a multiplicity of devices for extracting energy from the electric field (408), repeated in a modular way.

This example is a medium voltage three-phase power cable (606), with the device for extracting energy from the electric field (408) incorporated in such a way that the cable lights up with the presence of alternating voltage between its phases. However, this is just an application example that does not limit the use of the device for extracting energy from the electric field (408) and its possible variants in another type of power cable (606, 801, 1201) or another type of electrical energy.

The diagram in FIG. 9 shows the manufacturing process of the energy extraction system from the electric field in power cables (701, 1301, 1701, 2401) and how the incorporation of the device that extracts energy from of the electric field (408) takes place in a specific stage of the process, particularly, after the outer semiconductor layer (106).

The manufacturing process with each of the stages and the elements involved is summarized in FIG. 25, which outlines the most frequent cases of manufacturing the energy extraction system from the electric field in power cables (701, 1301, 1701, 2401), without these cases being the only ones in which the device for extracting energy from the electric field (408) can be incorporated into an insulated cable (606, 801, 1201).

FIG. 25 details the manufacturing process of energy extraction systems from the electric field in single-phase and three-phase power cables, for low, medium and high voltage, and details of the cases in which the energy extraction device from the electric field (408), it is applied over the primary insulation (104) and over the outer semiconductor layer (105). Thus, in FIG. 25, 6 systems for extracting energy from the electric field in power cables are detailed, 4 of which are described in the figures: FIGS. 7 (701), 13 (1301), 17 (1701), and 24 (2401).

Hereinafter, each of the figures that represent the stages that constitute the process of incorporation of the device that extracts energy from the electric field (408) within the manufacturing process of a system for extracting energy from the electric field in power cables (701, 1301, 1701, 2401) in a tripolar, mining, flexible, medium voltage cable, without this particular application limiting the use of the device for extracting energy from the electric field (408) and its variants, in another type of power cable (606, 801, 1201).

FIG. 11 shows a phase of a medium voltage power cable (606). The conductor (101) is made up of 7 rods. This phase has already incorporated the layers corresponding to a power cable that operates with medium voltage (medium voltage understood as the range between 2 kV and 69 kV). All these layers fulfill the function of controlling the electric field generated by the potential difference between the conductor (101) and the electrostatic grounding screen (105).

In this way, conductor number (101) already has the gauge (diameter) according to its specification and with its internal semiconductor layer (201), primary electrical insulation (104), layer external semiconductor (106), as seen in FIG. 21 (2101). In this example of the application process of the device that extracts energy from the electric field (408), it will be detailed how the device that extracts energy from the electric field (408) is applied between the outer semiconductor layers (106) and the electrostatic screen (105).

The multiplicity of energy extracting devices from the electric field (408) (insulating tape (401) with conductive sheets on both sides (402 and 403)), with their loads (404), arranged along the insulating tape (401), are on a reel, waiting to be incorporated into each of the phases indicated by the cable specification.

Figure 22:
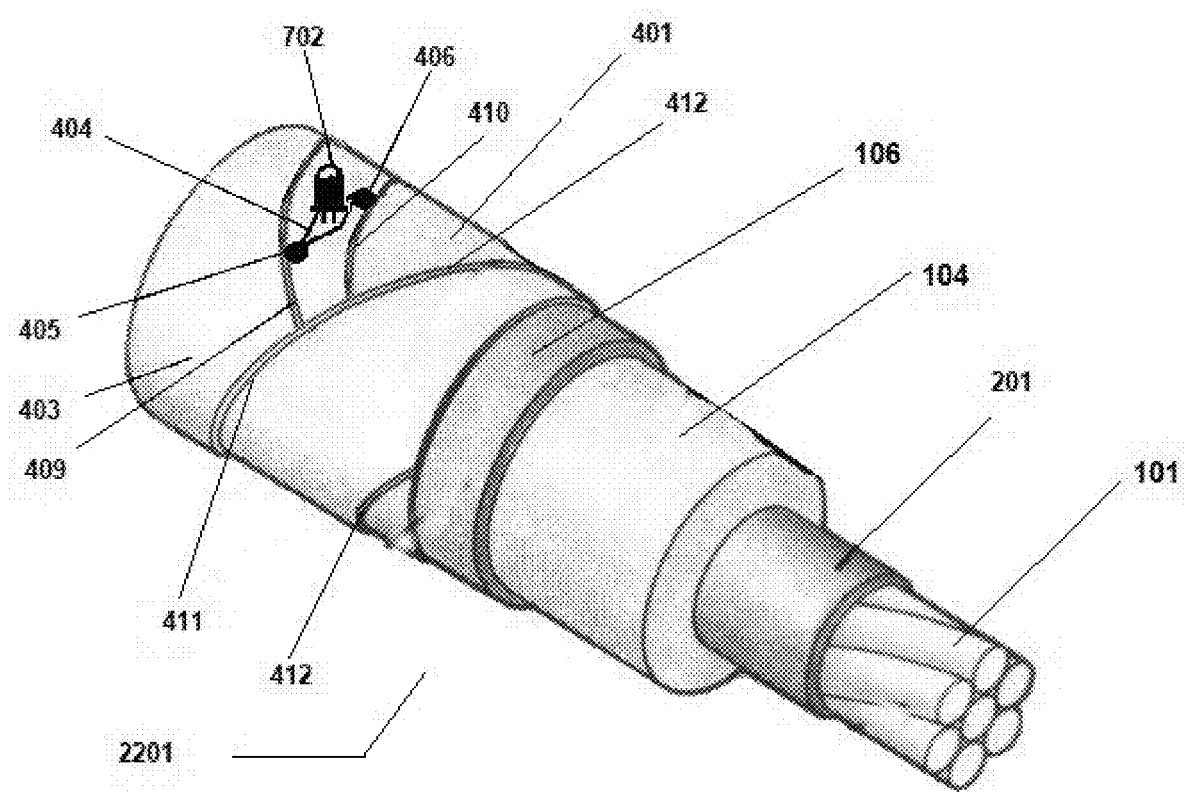
FIG. 22 shows an example of a conductor (101), with its internal semiconductor (201), with its primary insulation (104), with its external semiconductor (106) and whose device for extracting energy from the electric field, has been incorporated helically over the external semiconductor (106).

The device for extracting energy from the electric field (408) is incorporated into at least one of the phases of the cable (801, 606), in this particular case, over the outer semiconductor layer (106). Its incorporation can be longitudinal or helical. If it is helical, as shown in FIG. 22 (2201), care must be taken that the pitch (number of turns made by the energy extraction device from the electric field (408), around the phase in one meter length of the phase) is such that it allows the optimal operation of the energy extraction system from the electric field in power cables (701, 1301, 1701, 2401). This step is also determined by the cable specification. Each one of the phases with the device for extracting energy from the electric field (408), incorporated, is wound on a new spool.

Figure 23:
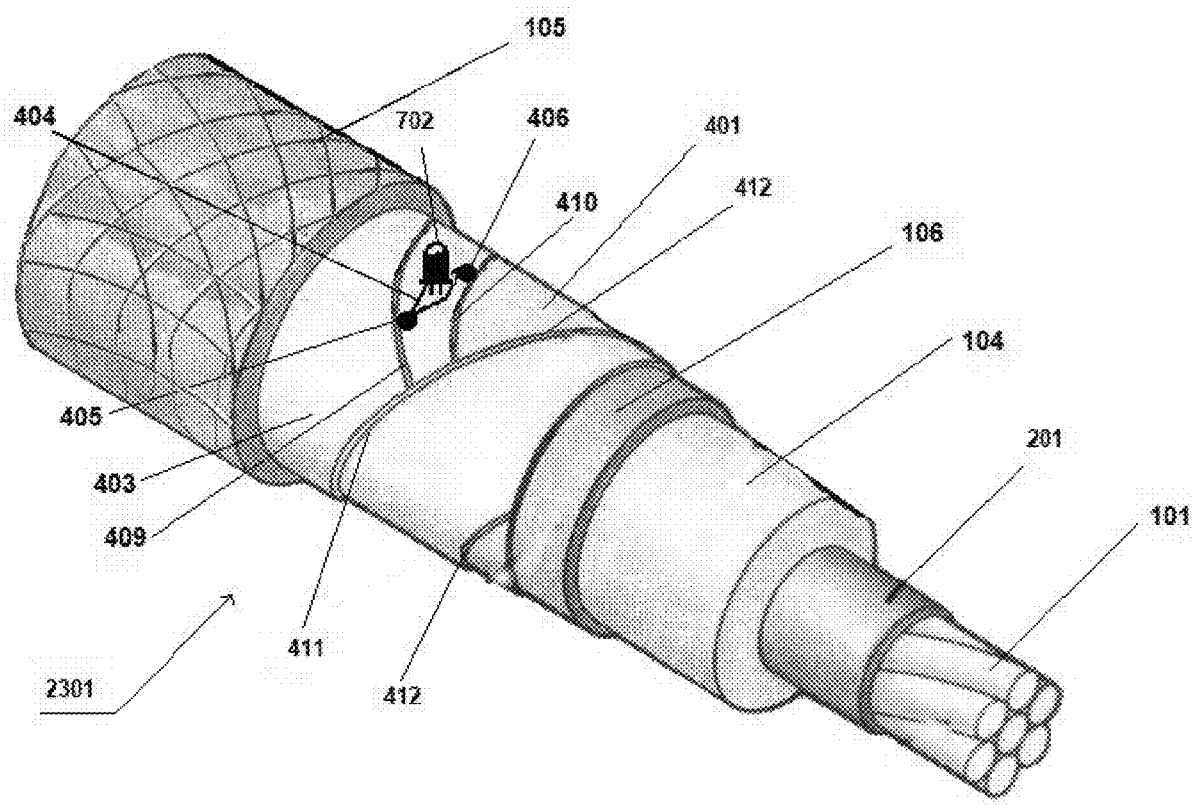
FIG. 23 shows an example of a conductor (101), with its internal semiconductor (201), with its primary insulation (104), with its external semiconductor (106), whose device for extracting energy from the electric field, has been incorporated helically over the external semiconductor (106) and, finally, the electrostatic screen (105).

With the device for extracting energy from the electric field (408) being incorporated in one or more phases, according to the cable specification, the electrostatic screen (105) is applied on the phases, as seen in FIG. 23 (2301). The cable specification may indicate that the electrostatic screen (105) be incorporated into each phase and then assembled and braided, or that they are braided first and then the electrostatic screen (105) is installed.

Once the energy extracting devices from the electric field (408) are incorporated, the electrostatic screen (105) is applied, and the cable phase is wound on a new reel.

Each one of the three phases of power cables (606) (numbers (601A), (601B) and (601C)) with all its layers already incorporated, is left on a new reel, waiting for: (i) be twisted together with the other two phases, the ground check wire (number (603)) and the ground wires (number (604)); and (ii) incorporating the electrostatic screen (105) on the set of elements just mentioned, or (ii) incorporating the electrostatic screen (105) on each phase and then braiding the set of elements just mentioned. The order of these stages will depend on the cable specification. After this process the set is wound on a new reel.

From all the phases that constitute the set, by extrusion, the outer jacket is added to the cable (605), taking care that if the loads of the energy extraction system from the electric field in power cables (701, 1301, 1701, 2401) are elements that emit light, the outer covering must be translucent and/or transparent. The energy extraction system in medium voltage three-phase power cables from the electric field can be seen in FIG. 24 (2401). This system of energy extraction in power cables from the electric field, already finished, is wound on its final reel.

FIG. 1 shows the electric field control layers of one of the phases of a medium voltage electric cable (606, 801).

If the cable is connected to the electrical network and there is voltage present in the network, then between the conductor (101) and the electrostatic screen (105) (normally grounded to confine the electric field (102)), there is a radial electric field (102). Now, if, in addition, an electric current circulates through the power cable (606, 801), a magnetic field (103) is generated, the concentric perimeter field lines of which are seen at number (103).

Number 101 represents the electrical power conductor (606, 801).

Number 102 represents radial electric field lines.

Number 103 represents the concentric perimeter lines of magnetic field.

Number 104 represents the primary insulation of the power cable phase (606, 801).

Number 105 represents the electrostatic shield of the power cable phase (606, 801).

Number 106 represents the outer semiconductor layer of the power cable phase (606, 801).

FIG. 2 shows a section view of the phase of a medium voltage electric cable (1101), which has a voltage applied to its conductor (101), relative to ground (203).

In this figure it can be seen that the electrostatic screen (105) is not grounded, which causes the electric field and its radial field lines (102) to be not confined within the area circumscribed by the electrostatic screen (105). A conductive surface (202), far from the electrostatic screen (105) is grounded and manages to confine the electric field.

The number 201 is the internal semiconductor layer that is in contact internally with the conductor (101) and externally with the primary insulation of the cable (104).

The number 202 is a conductive, grounded surface that manages to confine the electric field.

Number 203 is the ground connection.

Figure 3:
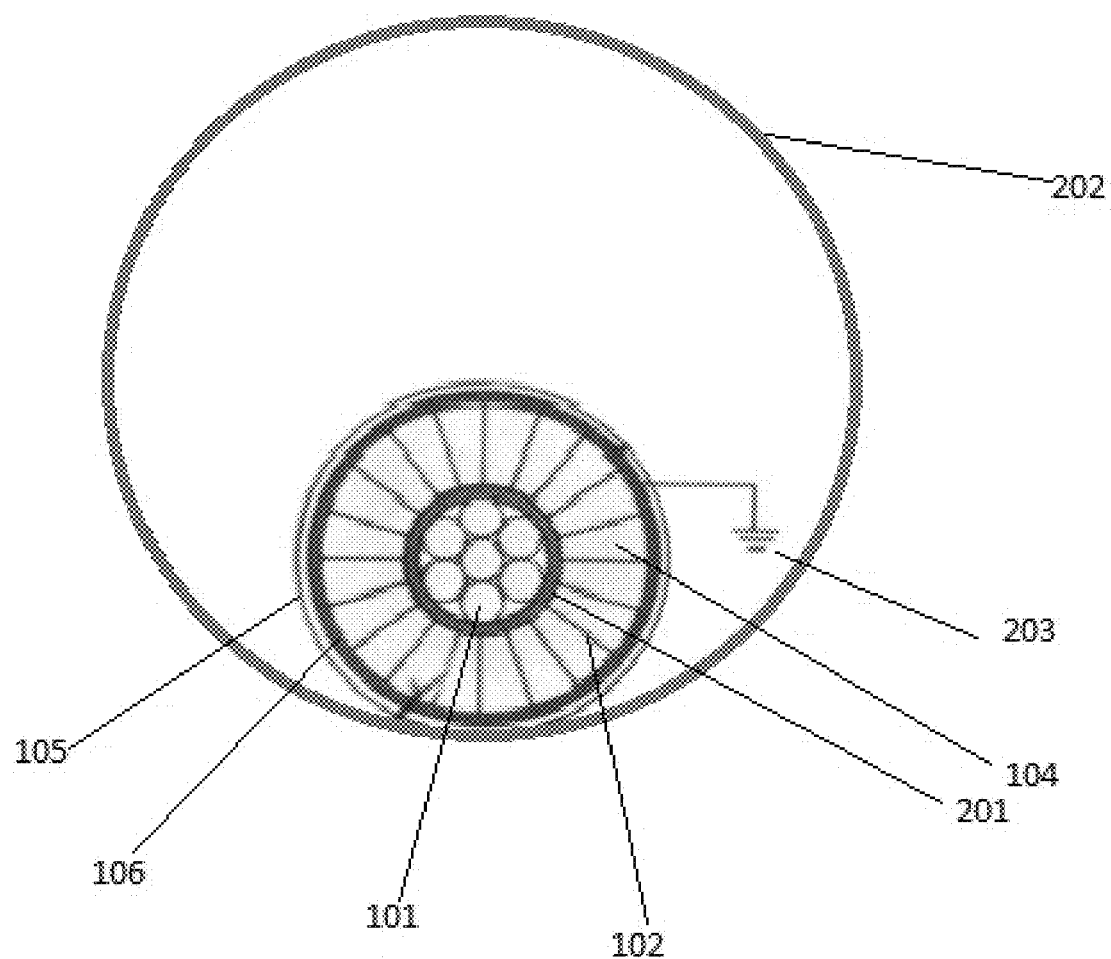
FIG. 3 shows a sectional view of the phase of an example of a medium voltage electric cable (1101) that has a voltage applied to its conductor (101), relative to ground (203).

FIG. 3 shows a sectional view of the phase of a medium voltage electric cable (1101) that has a voltage applied to its conductor (101), relative to ground (203).

This figure shows that the electrostatic screen (105) is grounded, which causes the electric field and its radial field lines (102) to be confined within the area circumscribed by the electrostatic screen (105). In this case, conductive surface (202) far from electrostatic screen (105) that is not grounded, has no electrical effect.

FIG. 4 shows:

A: side view of the device for extracting energy from the electric field (408) and a diagram of an electronic circuit representing the load (404) electrically powered by the device for extracting energy from the electric field (408).

B: top view of the device for extracting energy from the electric field (408) and a diagram of an electronic circuit representing the load (404) electrically powered by the device for extracting energy from the electric field (408).

Number 401 is the insulating sheet that separates the electric field harvester sheet (402) from the voltage reference sheet (403), which makes contact with the grounded electrostatic shield (105) of the power cable phase.

Number 402 is the electric field harvester inner sheet.

Number 403 is the outer voltage reference sheet.

Number 404 is a schematic of an electronic circuit that represents the load powered electrically by the energy extracting device from the electric field (408).

Number 405 is the electrical contact between the outer voltage reference sheet (403) and the electronic circuit representing the load (404).

Number 406 is the electrical contact between the internal electric field harvester sheet (402) and the electronic circuit representing the load (404).

Number 407 is the spacing to be left between the internal electric field harvester sheets (402).

Number 408 is the device for extracting energy from the electric field (408), made up of an internal electric field harvester sheet (402), an electrical insulating sheet (401) and a second external voltage reference sheet (403).

Number 409 is the limit of the wide side of the outer voltage reference sheet (403), which is in contact with the electrostatic screen (105).

Number 410 is the limit of the wide side of the inner electric field harvester sheet (402), which is in contact with the outer semiconductor layer (106).

Number 411 is the limit of the long side of the outer voltage reference sheet (403), which is in contact with the electrostatic shield (105).

Number 412 is the limit of the long side of the inner electric field harvester sheet (402), which is in contact with the outer semiconductor layer (106).

Figure 5:
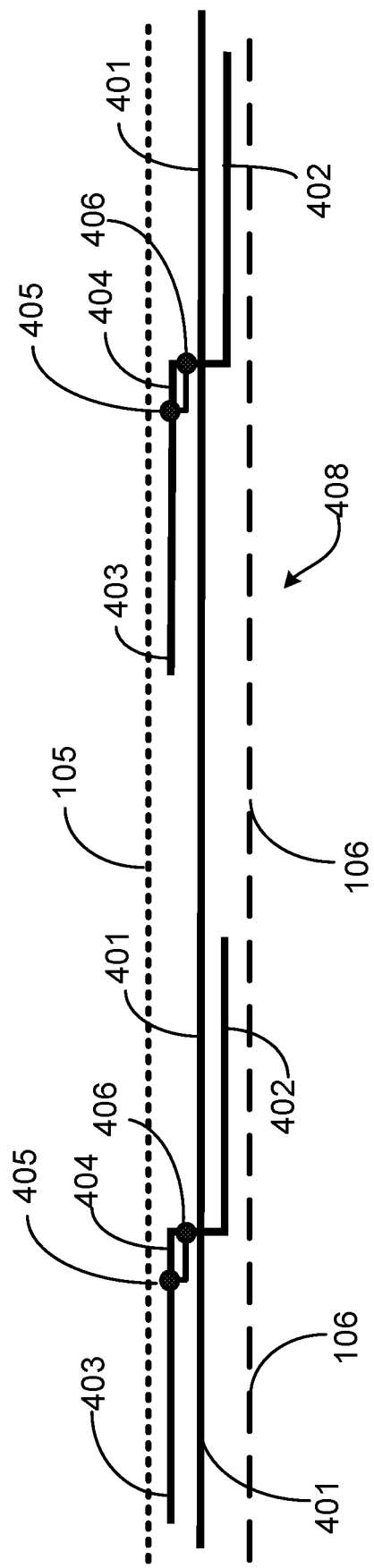
FIG. 5 shows a side view of an example of a device for extracting energy from the electric field (408) and a diagram of an electronic circuit that represents the load (404) electrically powered by the device for extracting energy from the electric field (408).

FIG. 5 shows a side view of the device for extracting energy from the electric field (408) and a diagram of an electronic circuit that represents the load (404) electrically powered by the device for extracting energy from the electric field (408).

Additionally, there are shown: (i) the semiconductor layer of the cable (106), which is in contact with the internal energy harvester sheet (402) and (ii) the electrostatic screen of the cable (105), which makes contact with the outer voltage reference sheet (403).

FIG. 6 is a three phase medium voltage power cable.

Number 601A is the complete A phase of the power cable.
Number 601B is the complete B phase of the power cable.
Number 601C is the complete C phase of the power cable.
Number 603 is the ground check wire of the medium voltage cable, which is an insulated electrical conductor.
Number 604 are the two earth wires of the medium voltage cable.
Number 605 is the outer jacket that covers all the above elements of the medium voltage cable.
Number 606 is the three-phase medium voltage cable, with all its layers.

FIG. 7 shows the system for extracting energy from the electric field in single-phase cables of medium or high voltage (701), whose device for extracting energy from the electric field (408) has been incorporated helically on the outer semiconductor layer (106).

Number 701 is the electrical energy extraction system from the electric field in power cables for single-phase medium voltage cables.
Number 702 is a representation of the electronic circuit (404) that takes advantage of the harvested energy. In particular, a light emitting diode is shown as load (404) of the device extracting energy from the electric field (408). For further reference, see FIG. 25.

Figure 8:
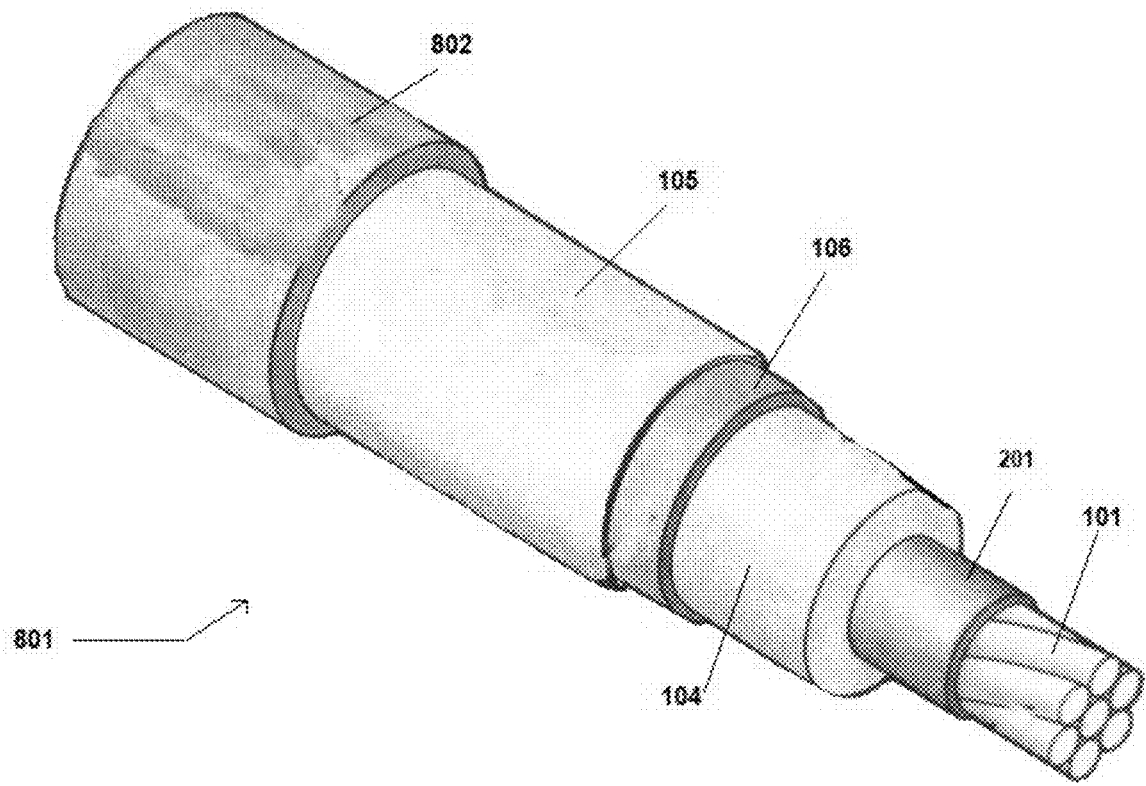
FIG. 8 shows an example of a single-phase medium voltage cable with all its layers.

FIG. 8 shows a single-phase medium voltage cable with all its layers.

Number 801 is the insulated wire.
Number 802 is the outer jacket of the insulated cable.

FIG. 9 is a diagram of the different cable manufacturing processes. In all of them it is possible to implement the energy extraction system from the electric field in power cables (701, 1301, 1701, 2401), during manufacturing the cable. The numbering in the figure corresponds to:

Number 1 is Copper Wire
Number 2 is Crafting and Annealing
Number 3 is the PVC insulation process
Number 4a is Simple Cable Product
Number 4b is Multiple Cable Product
Number 4c is Flexible Cable Product
Number 4d is Product Flat Cable with two wires
Number 4e is Product Power Cable
Number 4f is Armored Cable
Number 5 is PVC
Number 6 is the Braiding and Twisting process
Number 7 is the process of the outer layer of cladding
Number 8 is 7 to 61 stranded wires
Number 9 is Twisted and configured
Number 10 is Core Design
Number 11 is Steel Cable
Number 12 is Armored Steel Cable
Number 13 is XLPE (Cross-Linked Polyethylene)
Number 14 is the CCV Line FIG. 10 is a block diagram of a generic circuit, in this case, connected to alternating voltage, representing the load (404) that is connected to the internal harvesting tape (402) at the contact (406) and to the outer sheet (403), at the contact (405).

Number 1001 is a rectifier stage that converts alternating voltage to direct voltage to power the next stages of the circuit.
Number 1002 is an energy accumulating stage, which can be a capacitor of any type (electrolytic, ceramic, polarized, non-polarized, etc.).
Number 1003 is the stage in which the circuit gives the concrete functionality to the load. For example, it can be a LED for lighting functionality.
Number 1004 is a stage that contains a device with negative resistance, which allows the flow of current by lowering its resistance when there is a voltage between its terminals greater than the trigger voltage. This can be a diac or a neon light, etc.

FIG. 11 shows an insulated phase (1101) of a medium voltage electrical cable (single phase (801) or three phase (606)). This insulated phase can be found in a single-phase cable (801), which has in addition to all the layers of the phase, an insulating outer jacket (802) that protects it mechanically or it can also be found in a three-phase cable (606), together with two other insulated phases (1101) and all protected by an insulating outer cover (605) that protects it mechanically.

Number 1101 is the insulated phase that is composed of a conductor (101) and all the electric field control layers: inner semiconductor layer (201), primary insulation layer (104), outer semiconductor layer (106) and electrostatic shield (105), normally grounded.

Figure 12:
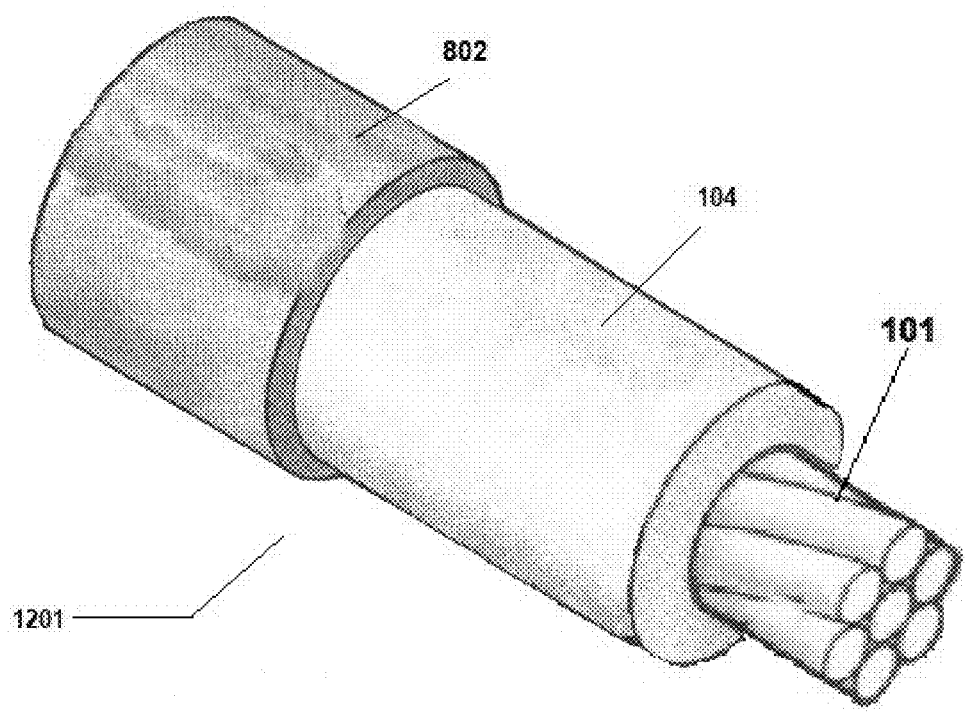
FIG. 12 shows an example of a low voltage insulated power cable.

FIG. 12 shows a low voltage insulated power cable, in which its only control of the electric field (102) is the primary insulation (104).

Number 1201 is the low voltage insulated power cable.

Figure 13:
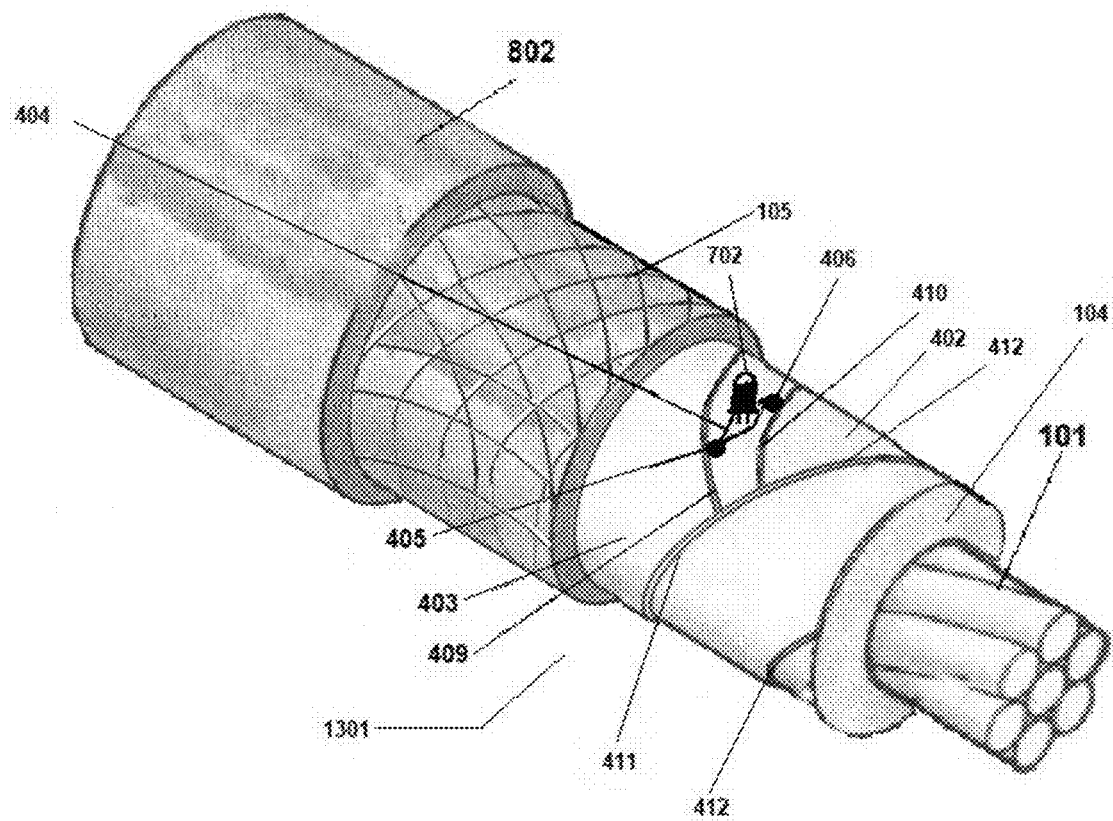
FIG. 13 shows an example of a system for extracting energy from the electric field in low voltage single-phase cables (1301), whose device for extracting energy from the electric field has been incorporated in a helical way, over the primary insulation 104).

FIG. 13 shows the system for extracting energy from the electric field in low voltage single-phase cables (1301), whose device for extracting energy from the electric field (408) has been incorporated in a helical way, over the primary insulation (104). For further reference, see FIG. 25.

Number 1301 is a system for extracting energy from the electric field in low voltage single phase power cables. That is, it is a low voltage single-phase power cable, with the device for extracting energy from the electric field (408) incorporated and made up of elements (401, 402, 403, 404, 405, 406 and 407).

FIG. 14 shows a phase of a low voltage cable, composed of a conductor (101) with its primary insulation (104). This is the first stage of the manufacturing process of the energy extraction system from the electric field in low voltage cables, single-phase (1301) and three-phase (1701). For further reference, see FIG. 25.

Number 1401 is a conductor (101) with its primary insulation (104).

Figure 15:
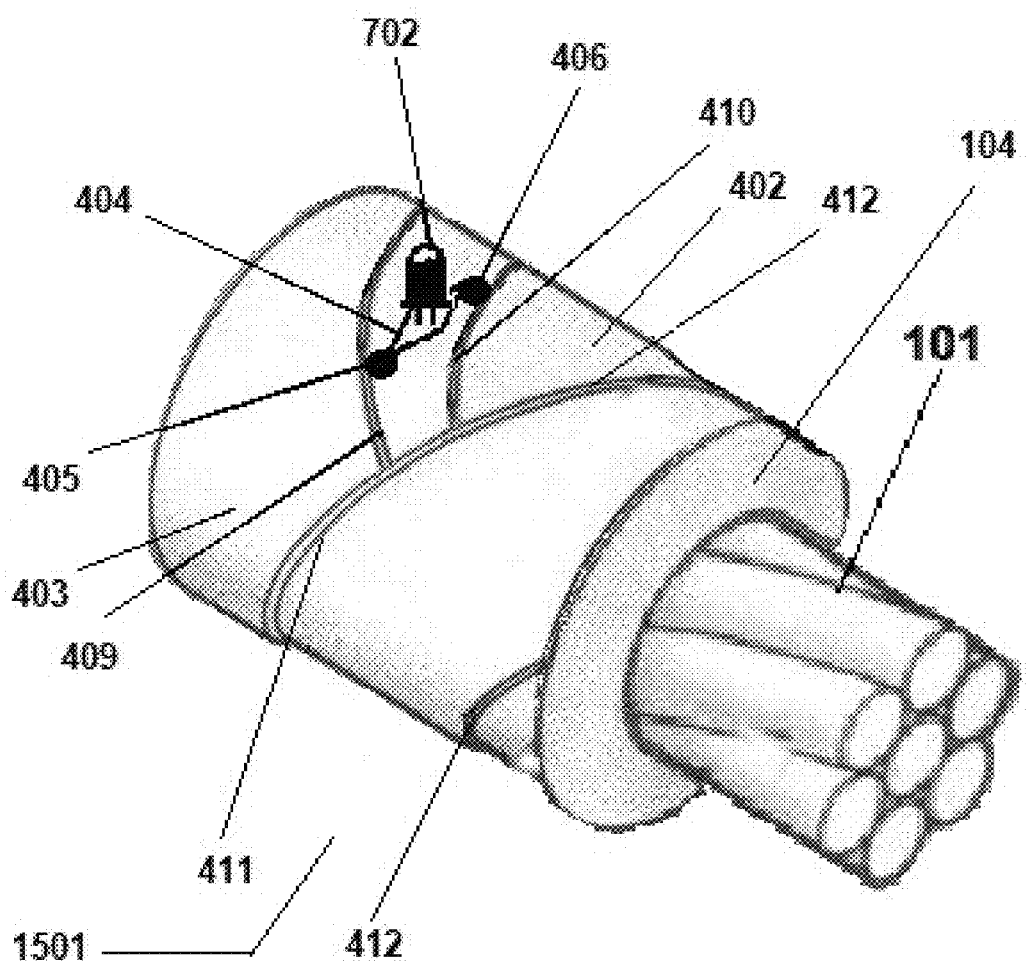
FIG. 15 shows an example of a conductor (101), with its primary insulation (104) and whose device for extracting energy from the electric field, has been incorporated helically over the primary insulation (104).

FIG. 15 shows a conductor (101), with its primary insulation (104) and whose device for extracting energy from the electric field (408), has been incorporated helically over the primary insulation (104). This is the second stage of the manufacturing process of the energy extraction system from the electric field in low voltage cables, single-phase (1301) and three-phase (1701). For further reference, see FIG. 25.

Number 1501 is a conductor (101), with its primary insulation (104) and whose device for extracting energy from the electric field (408), has been incorporated helically on the primary insulation (104).

Figure 16:
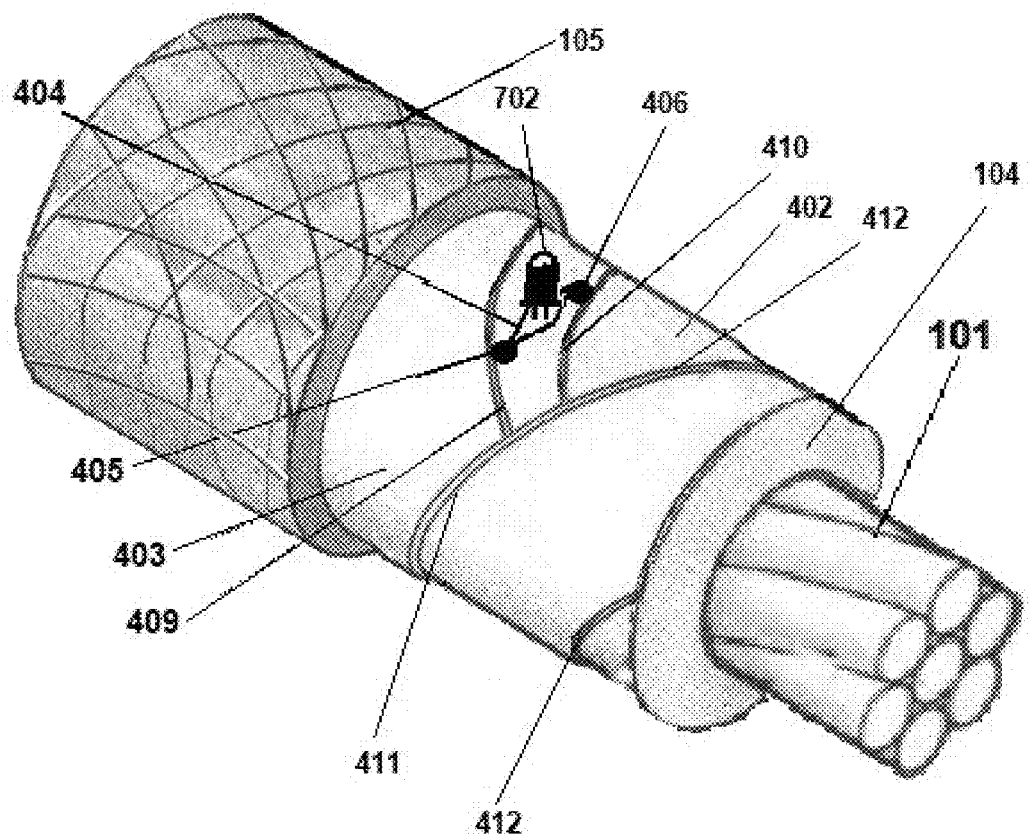
FIG. 16 shows an example of a conductor (101), with its primary insulation (104), whose device for extracting energy from the electric field, has been incorporated over the primary insulation (104) and finally, the electrostatic screen (105).

FIG. 16 shows a conductor (101), with its primary insulation (104), whose device for extracting energy from the electric field (408), has been incorporated over the primary insulation (104) and finally, the electrostatic screen (105). This is the third stage of the manufacturing process of the energy extraction system from the electric field in low voltage cables, single-phase (1301) and three-phase (1701). For further reference, see FIG. 25.

Figure 17:
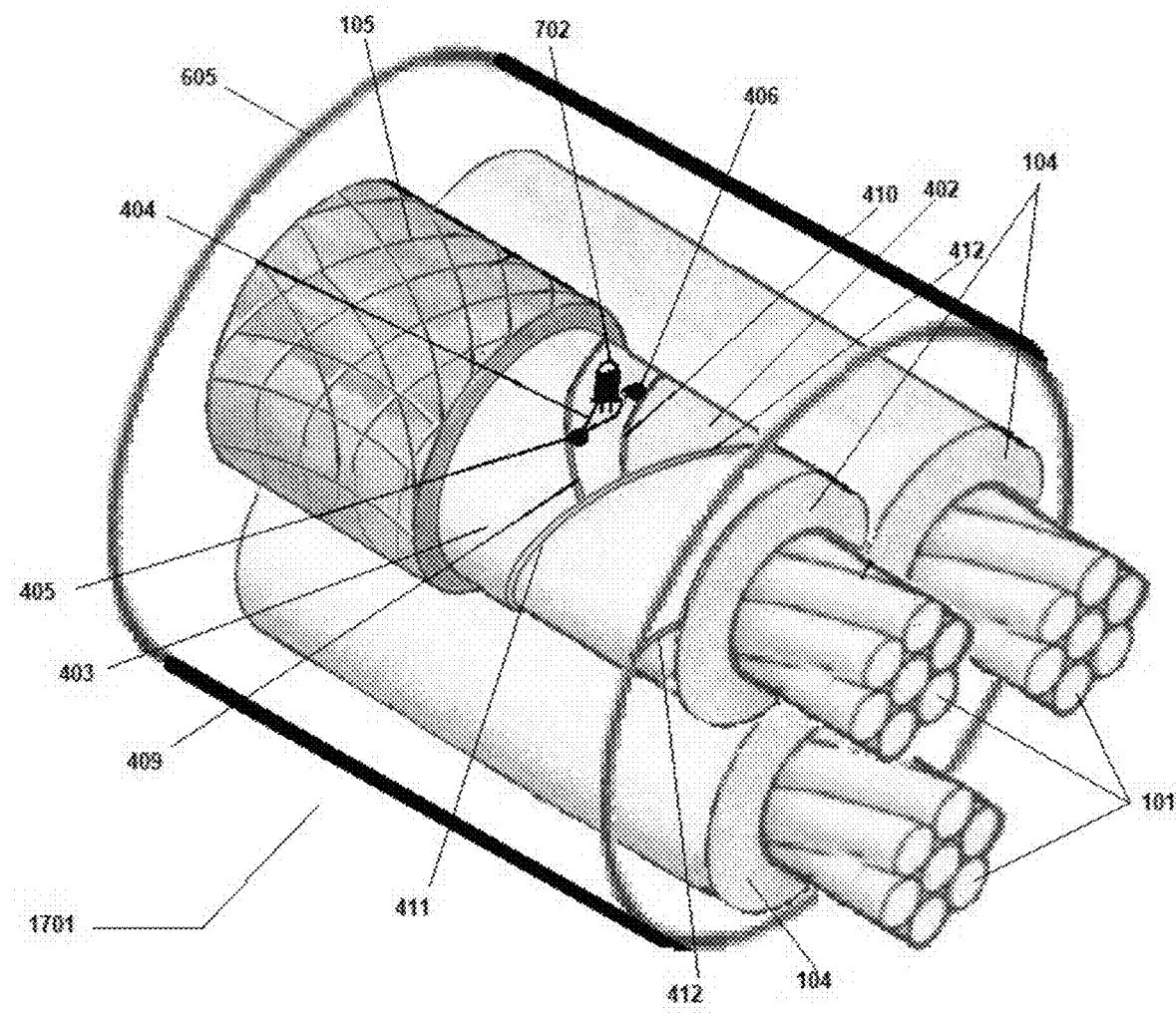
FIG. 17 shows an example of a system for extracting energy from the electric field in low voltage triphasic cables (1701), whose device for extracting energy from the electric field, has been incorporated in a helical way, over primary insulation (104).

FIG. 17 shows the system for extracting energy from the electric field in low voltage triphasic cables (1701), whose device for extracting energy from the electric field (408), has been incorporated in a helical way, over primary insulation (104). For further reference, see FIG. 25.

Number 1701 is a system for extracting energy from the electric field in low voltage three-phase power cables. That is to say, it is a low voltage, three-phase power cable, with the device for extracting energy from the electric field (408) incorporated in a helical way and made up of the elements (401, 402, 403, 404, 405, 406 and 407).

FIG. 18 shows a conductor (101), with its internal semiconductor (201) and with its primary insulation (104). This is the first stage of the manufacturing process of the energy extraction system from the electric field in medium or high voltage cables, single-phase and three-phase. For further reference, see FIG. 25.

FIG. 19 shows a conductor (101), with its internal semiconductor (201), with its primary insulation (104) and whose device for extracting energy from the electric field (408), has been incorporated helically over the primary insulation (104). This is the second stage of the process manufacturing of the energy extraction system from the electric field in medium voltage cables, single-phase and three-phase. For further reference, see FIG. 25.

Number 1901 is a conductor (101), with its internal semiconductor (201), with its primary insulation (104) and whose device for extracting energy from the electric field (408), has been incorporated helically over the primary insulation (104).

Figure 20:
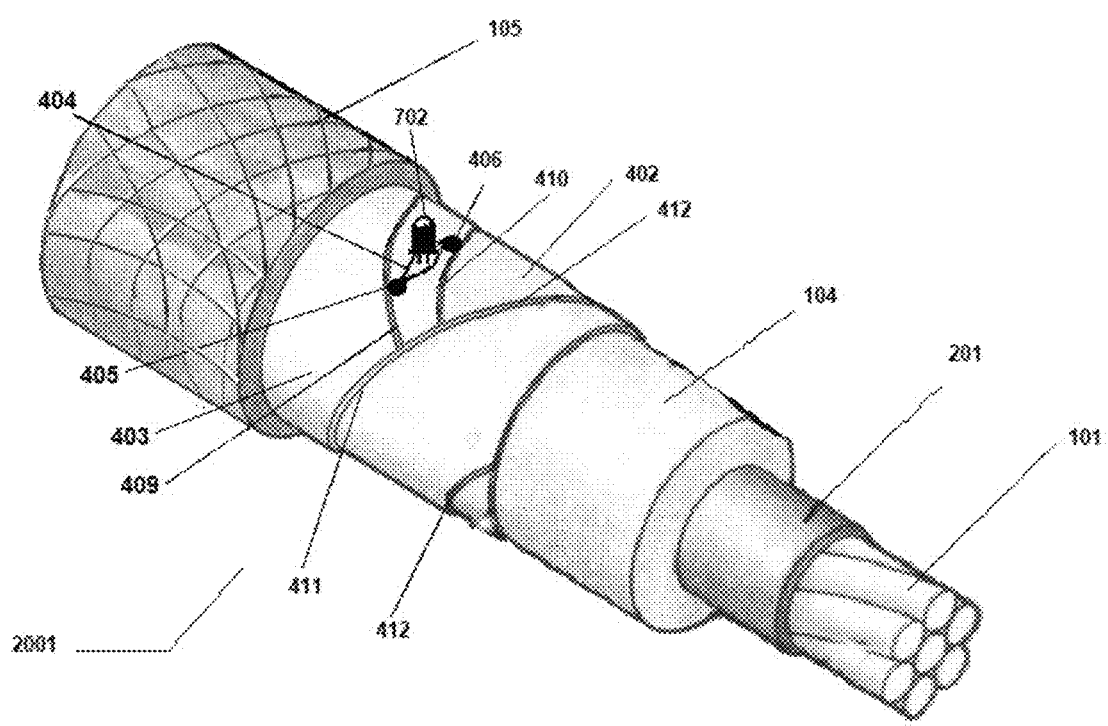
FIG. 20 shows an example of a conductor (101), with its internal semiconductor (201), with its primary insulation (104), whose device for extracting energy from the electric field, has been incorporated helically over the primary insulation (104) and, finally, the electrostatic screen (105).

FIG. 20 shows a conductor (101), with its internal semiconductor (201), with its primary insulation (104), whose device for extracting energy from the electric field (408), has been incorporated helically over the primary insulation (104) and, finally, the electrostatic screen (105). This is the third stage of the manufacturing process of the energy extraction system from the electric field in medium or high voltage cables, single-phase and three-phase. For further reference, see FIG. 25.

Number 2001 is a conductor (101), with its internal semiconductor (201), with its primary insulation (104), whose device for extracting energy from the electric field (408), has been incorporated helically over the primary insulation (104) and finally, the electrostatic screen (105).

FIG. 21 shows a conductor (101), with its inner semiconductor (201) with its primary insulation (104) and its outer semiconductor layer (106). This is the first stage of the manufacturing process of the energy extraction system from the electric field in medium or high voltage cables, single-phase (701) and three-phase (2401). For further reference, see FIG. 25.

Number 2101 is a conductor (101), with its inner semiconductor (201) with its primary insulation (104) and its outer semiconductor layer (106).

FIG. 22 shows a conductor (101), with its internal semiconductor (201), with its primary insulation (104), with its external semiconductor (106) and whose device for extracting energy from the electric field (408), has been incorporated helically over the external semiconductor (106). This is the second stage of the manufacturing process of the energy extraction system from the electric field in medium voltage cables, single-phase (701) and three-phase (2401). For further reference, see FIG. 25.

Number 2201 is a conductor (101), with its internal semiconductor (201), with its primary insulation (104), with its external semiconductor (106) and whose device for extracting energy from the electric field (408), has been incorporated helically over the external semiconductor (106).

FIG. 23 shows a conductor (101), with its internal semiconductor (201), with its primary insulation (104), with its external semiconductor (106), whose device for extracting energy from the electric field (408), has been incorporated helically over the external semiconductor (106) and, finally, the electrostatic screen (105). This is the third stage of the manufacturing process of the energy extraction system from the electric field in medium or high voltage cables, single-phase (701) and three-phase (2401). For further reference, see FIG. 25.

Number 2301 shows a conductor (101), with its internal semiconductor (201), with its primary insulation (104), with its external semiconductor (106), whose device for extracting energy from the electric field (408), has been incorporated helically over the external semiconductor (106) and finally, the electrostatic screen (105).

FIG. 24 shows the system for extracting energy from the electric field in three-phase cables of medium or high voltage (2401), whose device for extracting energy from the electric field (408), has been incorporated over the outer semiconductor layer (106). For further reference, see FIG. 25.

Number 2401 is a system for the extraction of energy from the electric field in three-phase power cables of medium or high voltage. That is, it is a three-phase power cable, of medium voltage, with the device for extracting energy from the electric field (408) incorporated in a helical way and made up of the elements (401, 402, 403, 404, 405, 406 and 407).

FIG. 25 details the manufacturing process of energy extraction systems from the electric field in single-phase and three-phase power cables, for low, medium and high voltage, and details of the cases in which the energy extraction device from the electric field (408), it is applied over the primary insulation (104) and over the outer semiconductor layer (105). Thus, in FIG. 25, 6 energy extraction systems are detailed in power cables from the electric field. However, these 6 systems for extracting energy from the electric field in power cables are only examples and are not the only possible ones.

A number of embodiments have been described. Nevertheless, it will be understood that various modifications may be made without departing from the spirit and scope of the invention. Other embodiments are within the scope of the following claims.

What is claimed is:

1. A system for extracting electric energy from an electric field in power cables, wherein the system comprises
    the power cable;
    at least one modular power extraction device arranged inside a power cable, the at least one modular power extraction device being configured to extract energy from an electric field of the power cable,
    wherein each modular power extraction device is arranged in a respective phase of the power cable and does not make electrical contact with one or more main conductors of the respective phase of the power cable, and wherein each modular power extraction device comprises:

an internal electrically conductive sheet arranged to harvest the electric field present in the vicinity of the main conductor of the respective phase in which the modular power extraction device is arranged;

an external electrically conductive sheet;

an electrically insulating layer that separates the internal electrically conductive sheet from the external electrically conductive sheet; and a load attached to the electrically insulating layer, wherein the modular power extraction device is arranged over at least one of an inner semiconductor layer, a primary insulation, and an external semiconductor layer of the respective phase in which the modular power extraction device is arranged, and wherein the load is configured to consume energy from the internal electrically conductive sheet wherein the external electrically conductive sheet is in electrical contact with a voltage reference element of the power cable.

2. The system of claim 1, wherein each modular power extraction device is wound helically around over at least one of the inner semiconductive layer, the primary insulation, and the external semiconductive layer of the respective phase in which the modular power extraction device is arranged.

3. The system of claim 1, wherein each modular power extraction device is longitudinally arranged over the inner semiconductive layer, the primary insulation or the external semiconductive layer of the respective phase in which the modular power extraction device is arranged.

4. The system of claim 1, wherein the load comprises one or more light emitting elements, the power cable comprises an outer cover that is translucent or transparent.

5. The system of claim 1, wherein the power cable is a three-phase power cable.

6. The system of claim 1, wherein the power cable is a single-phase power cable.

7. The system of claim 1, wherein the power cable is at least a partially insulated power cable.

8. A device for extracting electric energy from an electric field in a power cable, wherein the device comprises:

an internal electrically conductive sheet arranged to harvest the electric field present in the vicinity of a main conductor of the power cable;

an external electrically conductive sheet;

a load electrically coupled to the internal electrically conductive sheet at a first terminal and to the external electrically conductive sheet at a second terminal; and an electrically insulating layer that separates the internal electrically conductive sheet from the external electrically conductive sheet, and that joins the internal electrically conductive sheet, the external electrically conductive sheet, and the load together, wherein the device is arranged inside of the power cable and over at least one of an inner semiconductive layer, a primary insulation, and an external semiconductive layer of the power cable, wherein the external electrically conductive sheet is in contact with a voltage reference element of the power cable.

9. The device of claim 8, wherein the internal and external electrically conductive sheets are copper.

10. The device of claim 8, wherein the load comprises a radio frequency transmitter, a GPS device, a sensor, a transmitter, a light emitting device, or an audio device.

11. The device of claim 8, comprising an accumulator, wherein the accumulator is configured to receive energy from the internal and external electrically conductive sheets, and to deliver energy to the load when the power cable is not connected to a voltage source.

12. The device of claim 11, wherein the accumulator comprises a capacitor, a supercapacitor and/or a battery.

13. The device of claim 8, wherein a number of modules that form the device is based on an amount of energy available from the electric field of the power cable.

14. A method of manufacturing a power cable, the power cable comprising one or more phases, the method comprising:

constructing, for each phase, a respective bare conductor from conductive rods or wires, wherein the conductive rods or wires are bundled and twisted helically;

adding, for each phase, a primary electrically insulating layer, an internal semiconductor layer, an external semiconductor layer or any combination thereof to the bare conductor of the phase;

incorporating, for each phase, a respective device for extracting electric energy from an electric field longitudinally or helically in the power cable, wherein the device does not make electrical contact with the bare conductor of the phase;

applying an electrostatic grounding screen to each phase of the power cable; and providing an outer cover to the power cable.

15. The method of claim 14, wherein the outer cover is translucent or transparent.

16. The method of claim 14 wherein the device is arranged in an helical manner over at least one phase of the one or more phases.

17. The method of claim 14, wherein the device is arranged longitudinally over at least one phase of the one or more phases.

18. A method of manufacturing an electric energy extraction device for extracting energy from an electric field, the method comprising:

adhering two electrically conductive sheets to an electrically insulating sheet, each electrically conductive sheet being adhered to a different face of the insulating sheet;

connecting a load to the electrically conductive sheets to provide the electric energy extraction device; and positioning a plurality of the electric energy extraction devices longitudinally within a power cable, wherein a spacing between each electric energy extraction device is based on a predetermined length of the power cable.

19. The method of claim 14, wherein adding the primary insulation comprises extruding the primary insulation layer.

20. The method of claim 14, wherein the power cable is a high voltage power cable.

21. The method of claim 14, further comprising adding a respective protective layer to the bare conductor of each phase of the power cable.

22. The method of claim 14, wherein the power cable is a multi-phase cable, wherein the method further comprises twisting the phases of the multi-phase cable helically together.

* * * * *